（12）United States Patent
La Rosa et al.

(10) Patent No.: US 12,143,108 B2
(45) Date of Patent: Nov. 12, 2024

(54) PHYSICALLY UNCLONABLE FUNCTION DEVICE

(71) Applicants: STMicroelectronics (Rousset) SAS, Rousset (FR); STMicroelectronics International N.V., Schiphol (NL)

(72) Inventors: Francesco La Rosa, Rousset (FR); Marco Bildgen, Habere-Poche (FR)

(73) Assignees: STMicroelectronics (Rousset) SAS, Rousset (FR); STMicroelectronics International N.V., Schiphol (NL)

( * ) Notice: Subject to any disclaimer, the term of this patent is extended or adjusted under 35 U.S.C. 154(b) by 213 days.

(21) Appl. No.: 17/812,127

(22) Filed: Jul. 12, 2022

(65) Prior Publication Data

US 2023/0015627 A1 Jan. 19, 2023

(30) Foreign Application Priority Data

Jul. 13, 2021 (FR) .................................... 2107580

(51) Int. Cl.
| | |
|---|---|
| *H03K 19/17768* | (2020.01) |
| *H03K 19/08* | (2006.01) |
| *H03K 19/1776* | (2020.01) |
| *H04L 9/32* | (2006.01) |

(52) U.S. Cl.
CPC ... *H03K 19/17768* (2013.01); *H03K 19/0813* (2013.01); *H03K 19/1776* (2013.01)

(58) Field of Classification Search
None
See application file for complete search history.

(56) References Cited

U.S. PATENT DOCUMENTS

| | | | |
|---|---|---|---|
| 9,368,215 B2 | 6/2016 | La Rosa et al. | |
| 9,825,186 B2 | 11/2017 | La Rosa et al. | |
| 10,438,960 B2 | 10/2019 | La Rosa et al. | |
| 2008/0256600 A1 | 10/2008 | Schrijen et al. | |
| 2013/0228846 A1 | 9/2013 | La Rosa et al. | |
| 2020/0036539 A1* | 1/2020 | Hung | H04L 9/0816 |
| 2021/0303735 A1* | 9/2021 | La Rosa | H04L 9/3278 |
| 2021/0399905 A1* | 12/2021 | Kwak | G06F 21/73 |

FOREIGN PATENT DOCUMENTS

| | | |
|---|---|---|
| FR | 2002929 A1 | 10/1969 |
| FR | 3025649 | 3/2016 |
| FR | 3049380 A1 | 9/2017 |
| FR | 3059458 A1 | 6/2018 |
| FR | 3108782 A1 | 10/2021 |

OTHER PUBLICATIONS

Gassend B. L. P., "Physical Random Functions Thesis" Thesis At The Massachusetts Institute Of Technology, Feb. 1, 2003, 89 Pages.

* cited by examiner

*Primary Examiner* — Anh Q Tran
(74) *Attorney, Agent, or Firm* — Slater Matsil, LLP

(57) ABSTRACT

In an embodiment an integrated device includes a first physical unclonable function module configured to generate an initial data group and management module configured to generate an output data group from at least the initial data group, authorize only D successive deliveries of the output data group on a first output interface of the device, D being a non-zero positive integer, and prevent any new generation of the output data group.

20 Claims, 35 Drawing Sheets

[Fig 1]
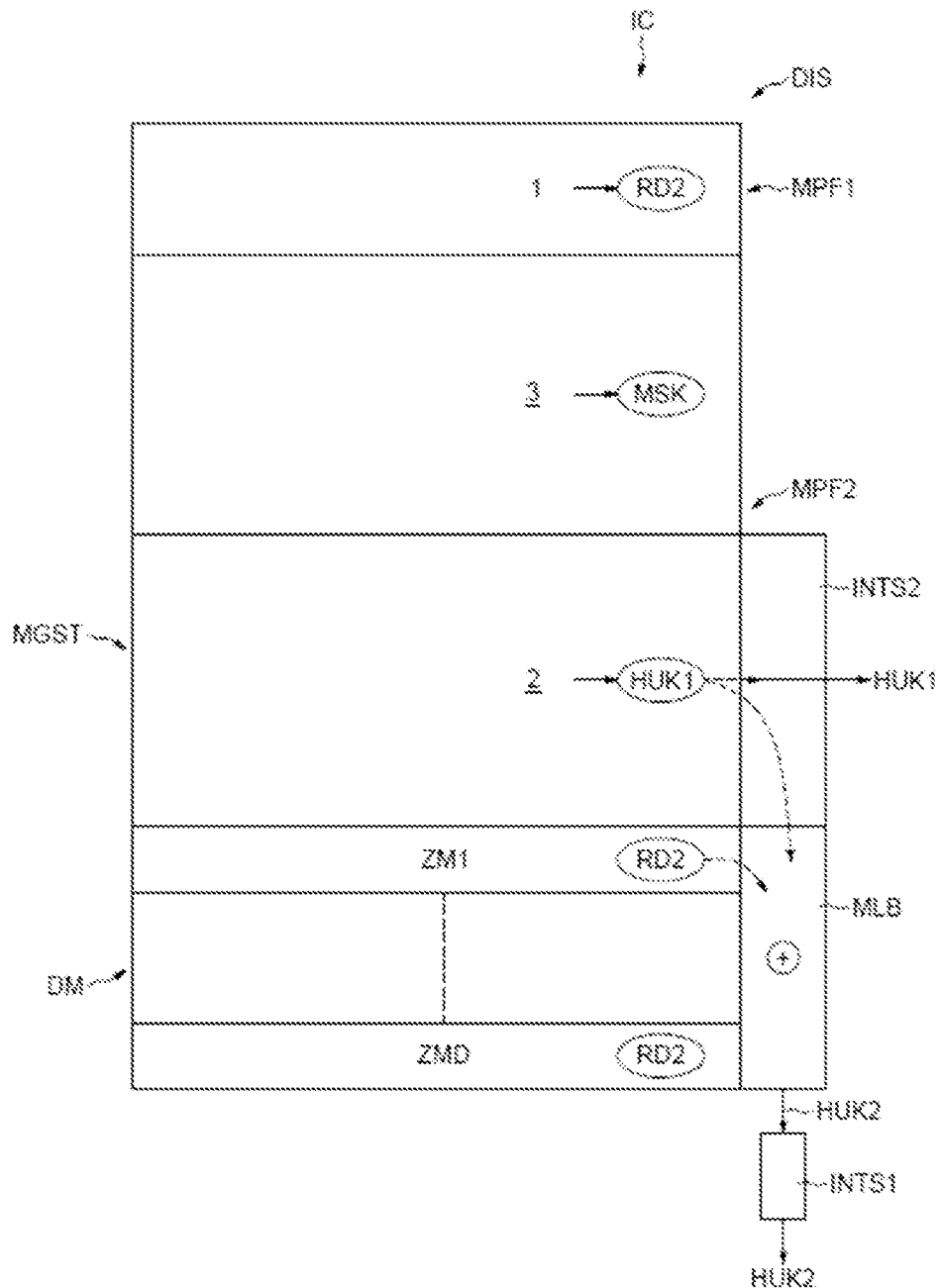

[Fig 2]
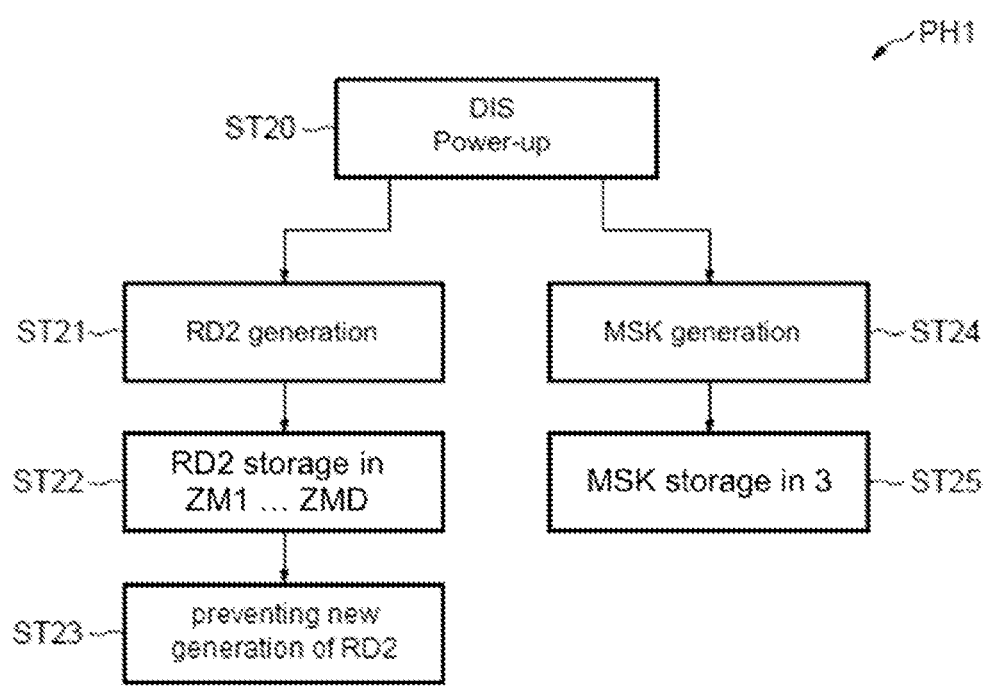

[Fig 3]
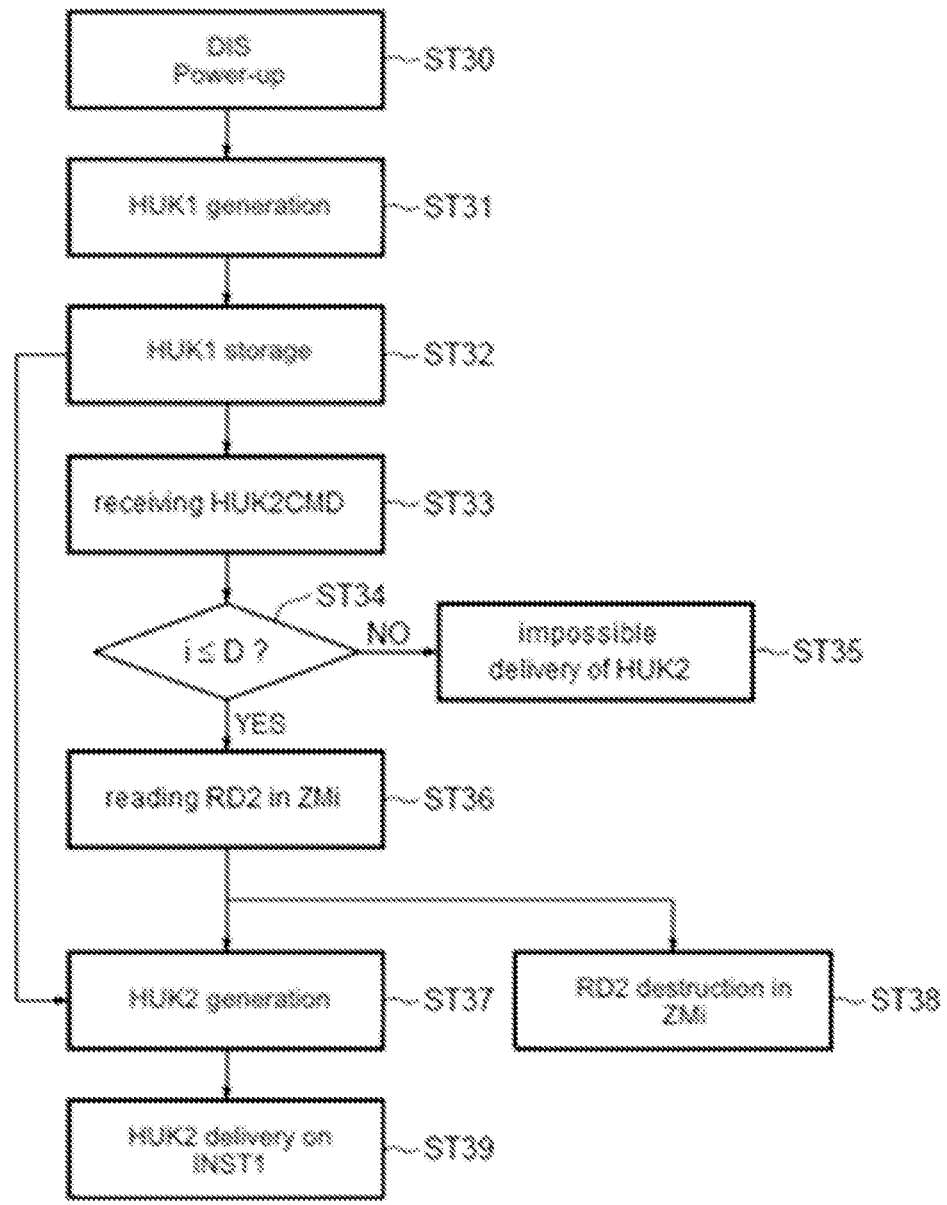

[Fig 4]
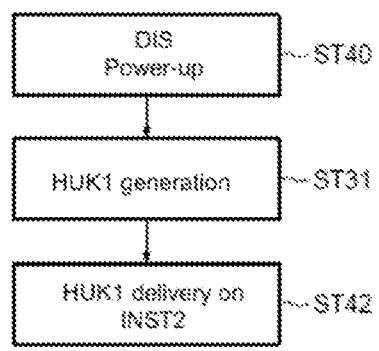
[Fig 5]
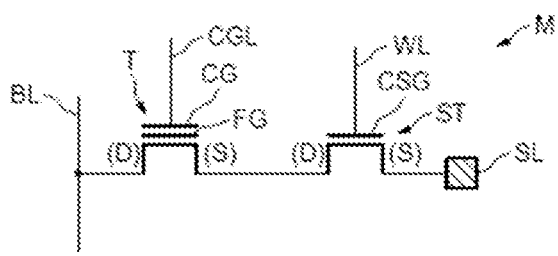

[Fig 6]
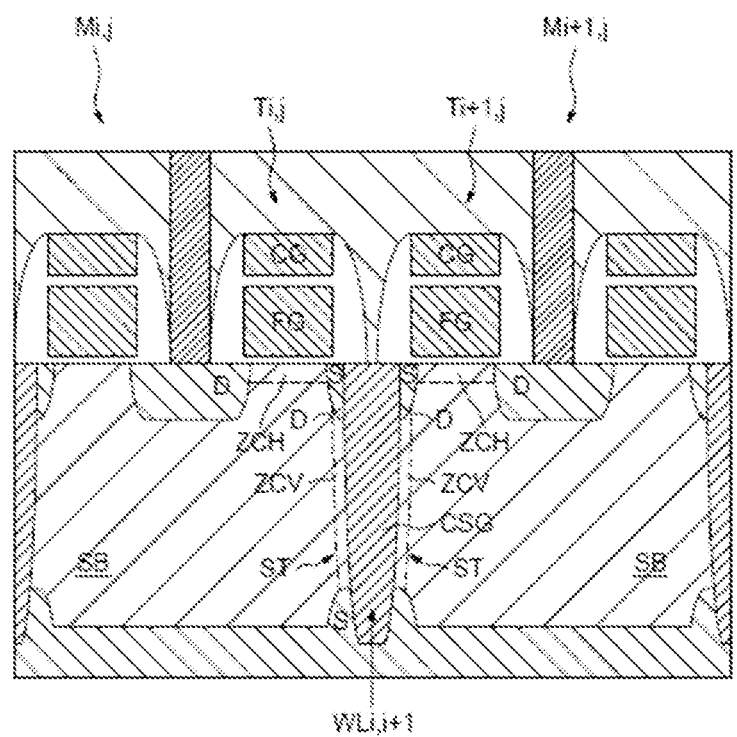

[Fig 7]
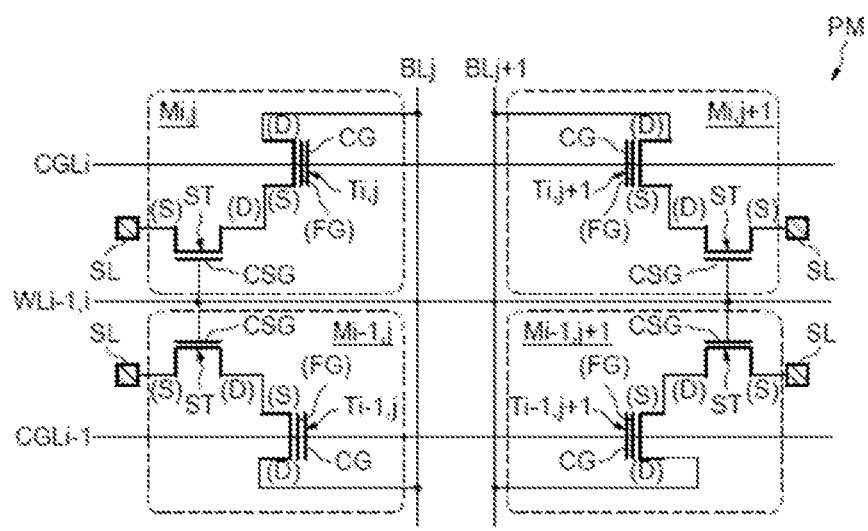

[Fig 8]
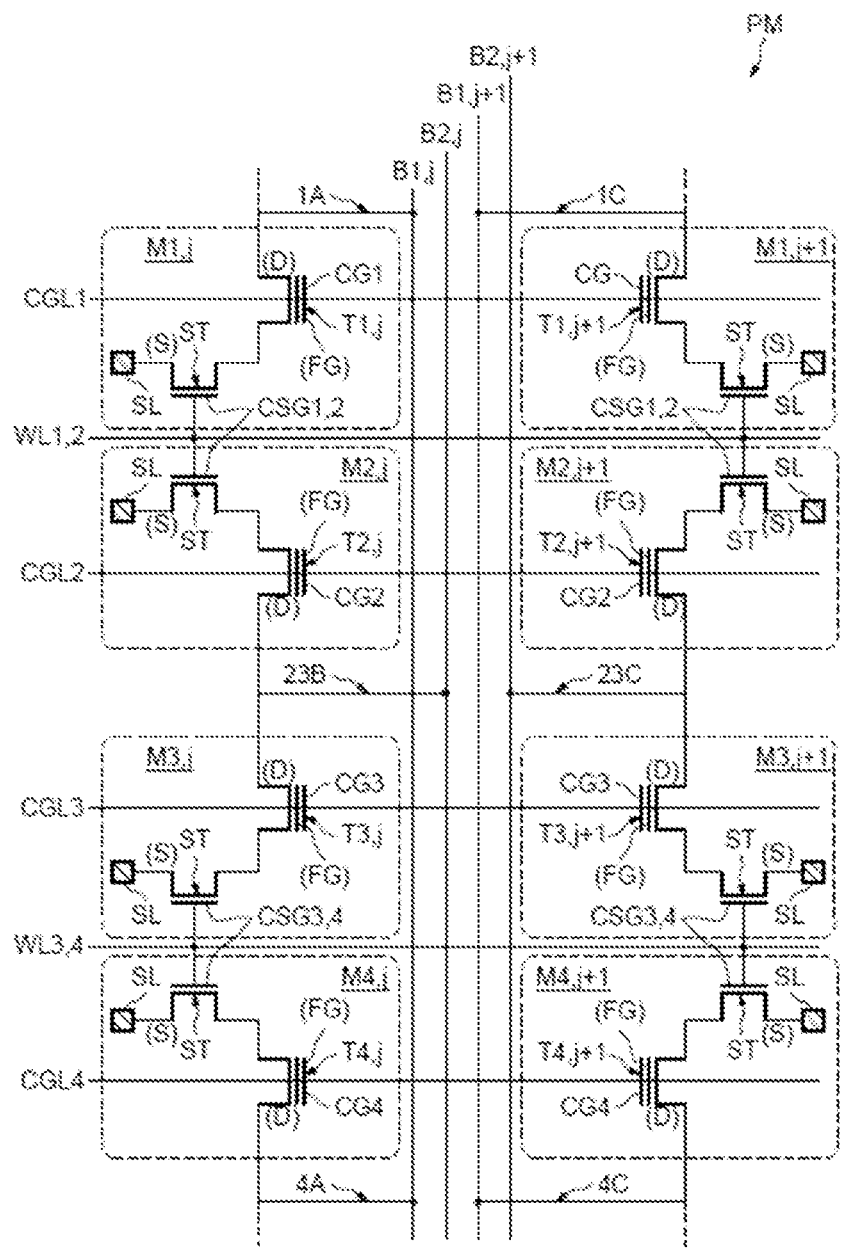

[Fig 9]
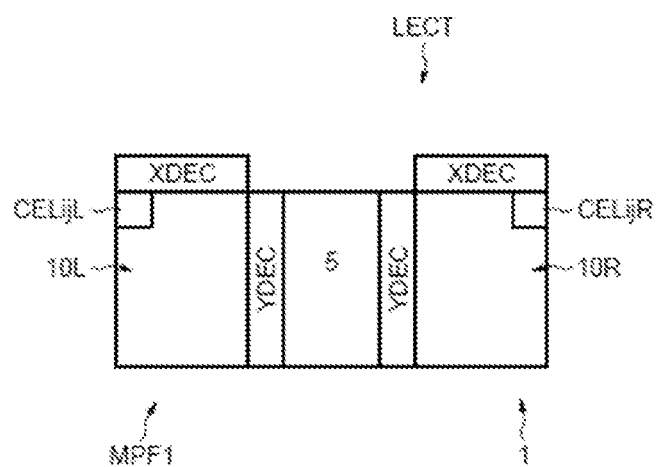

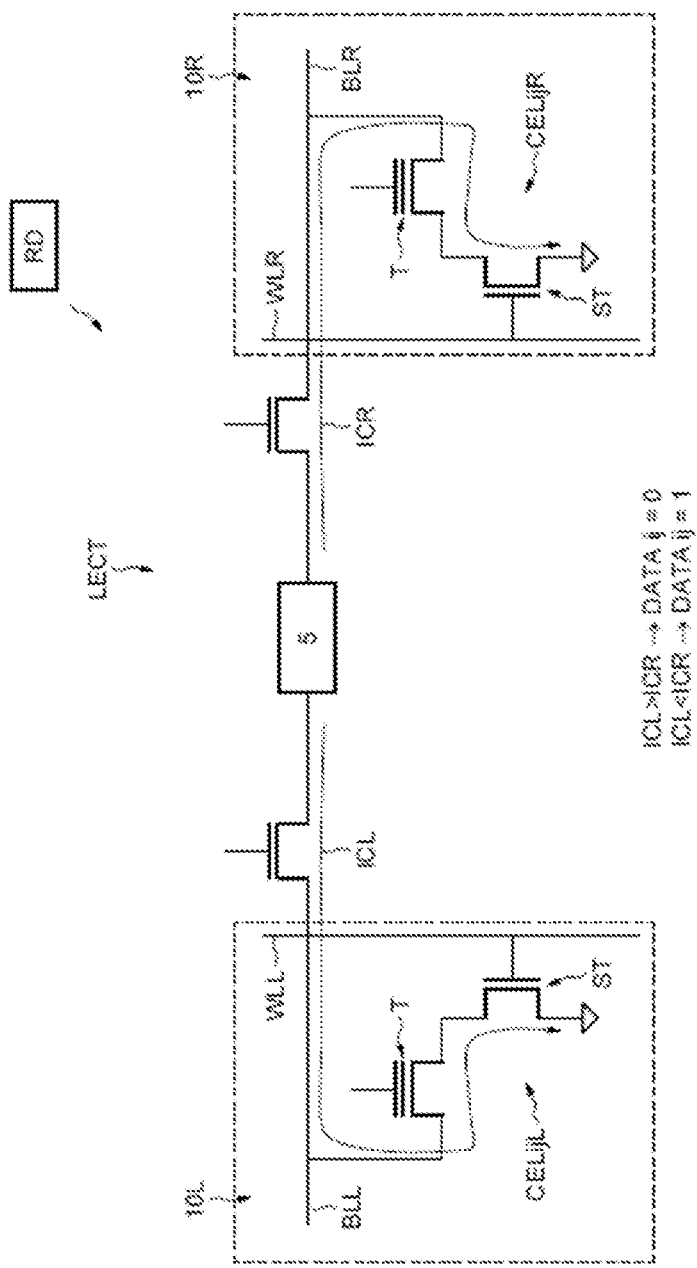
[Fig 10]

[Fig 11]
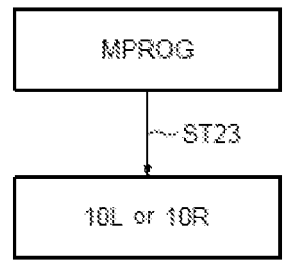
[Fig 12]
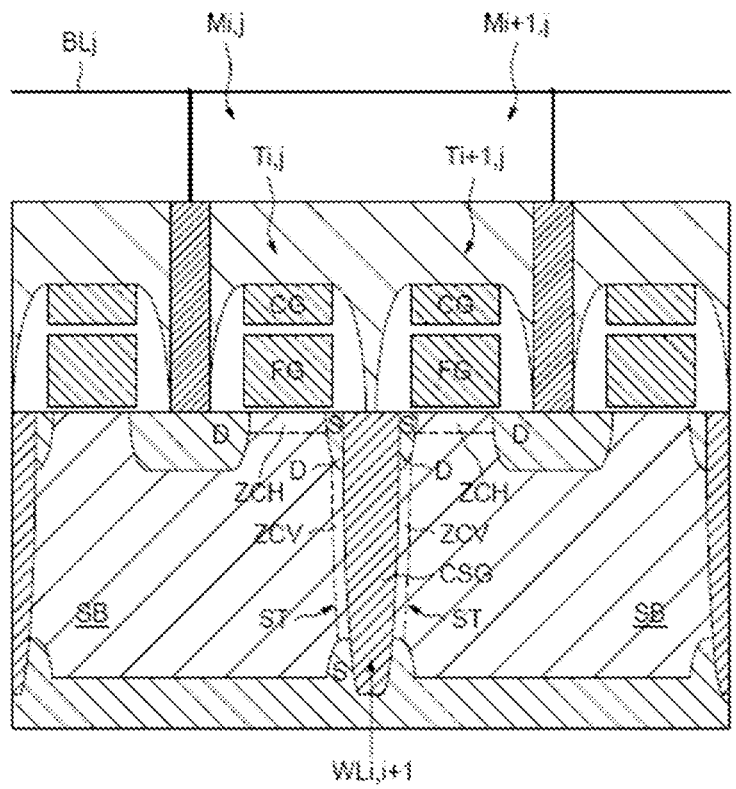

[Fig 13]
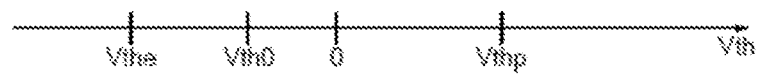

[Fig 14]
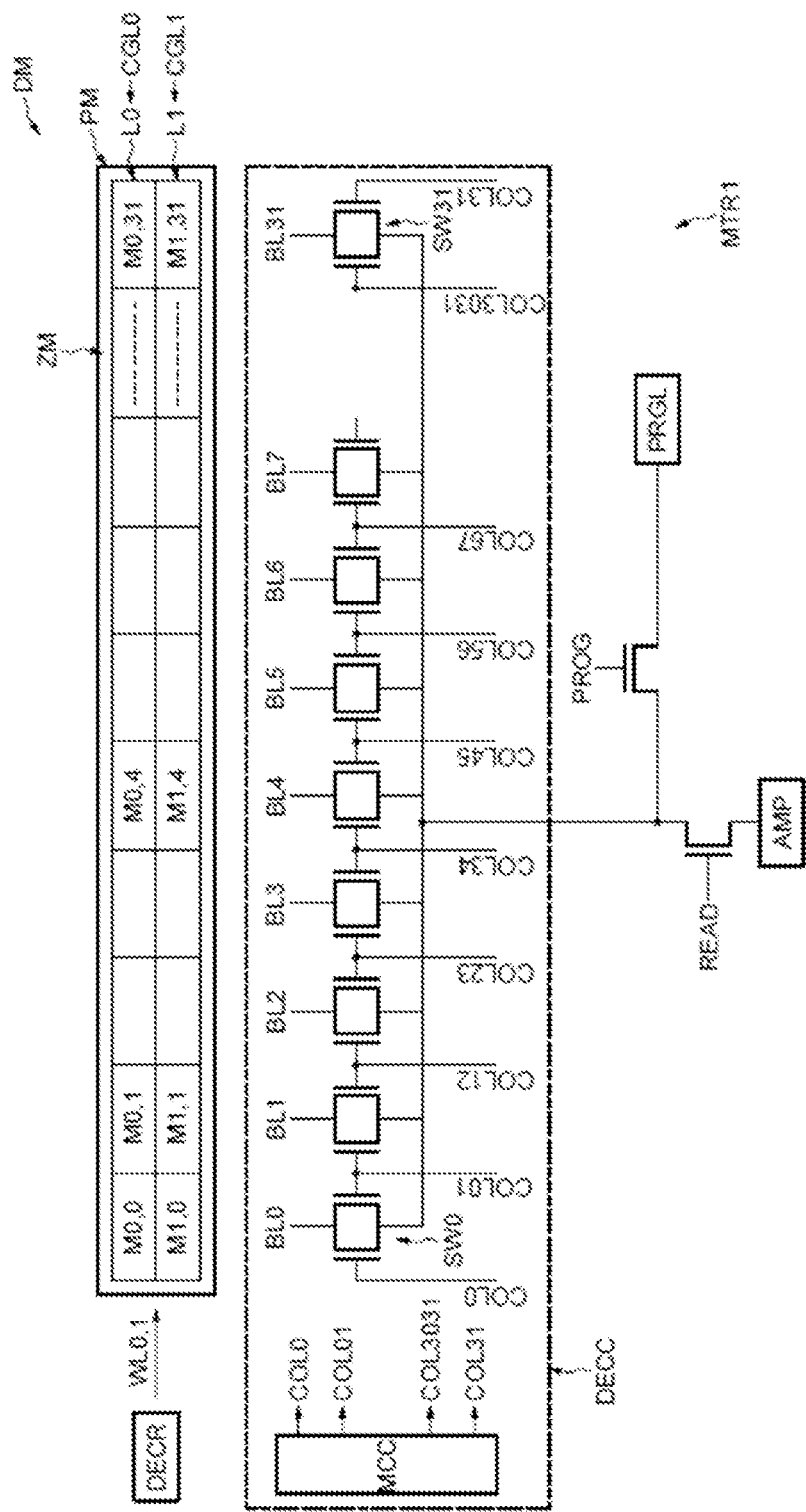

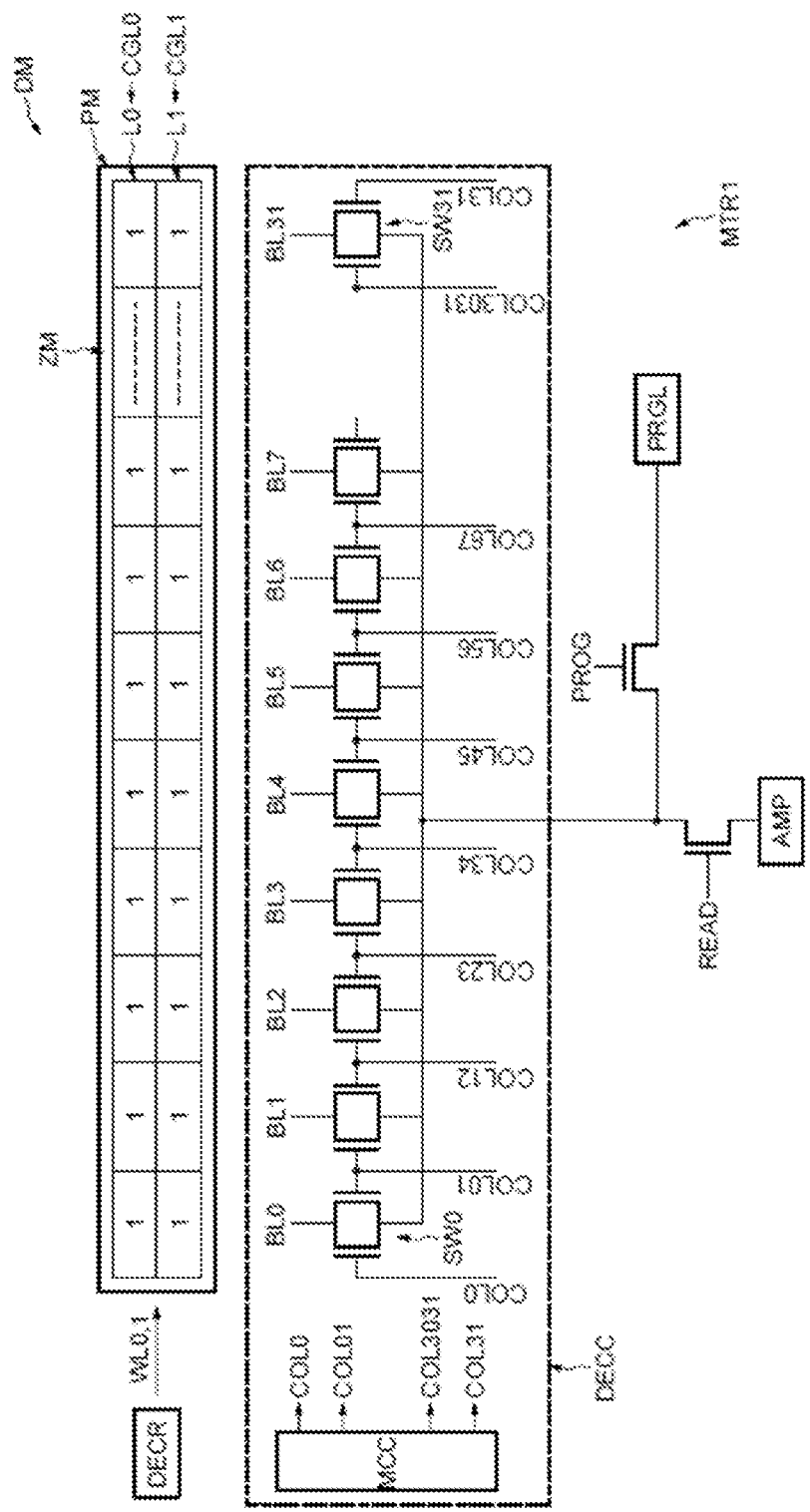
[Fig 15]

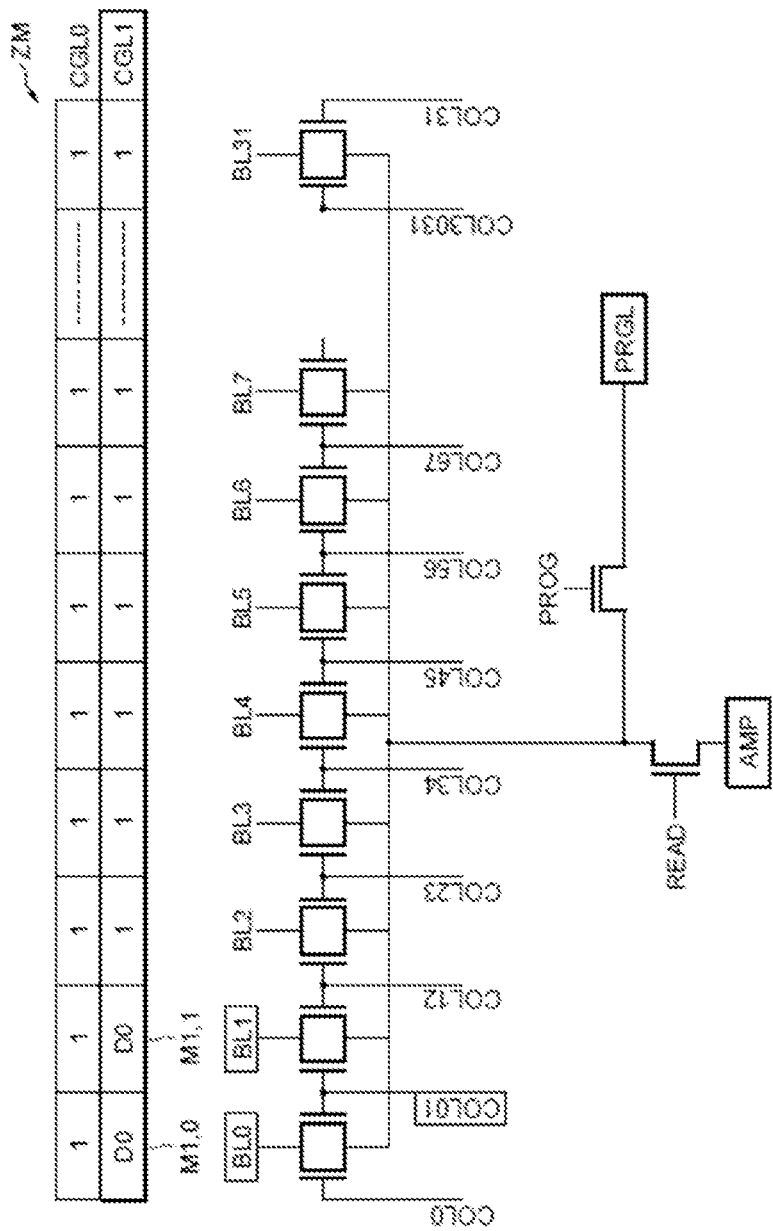
[Fig 16]

[Fig 17]
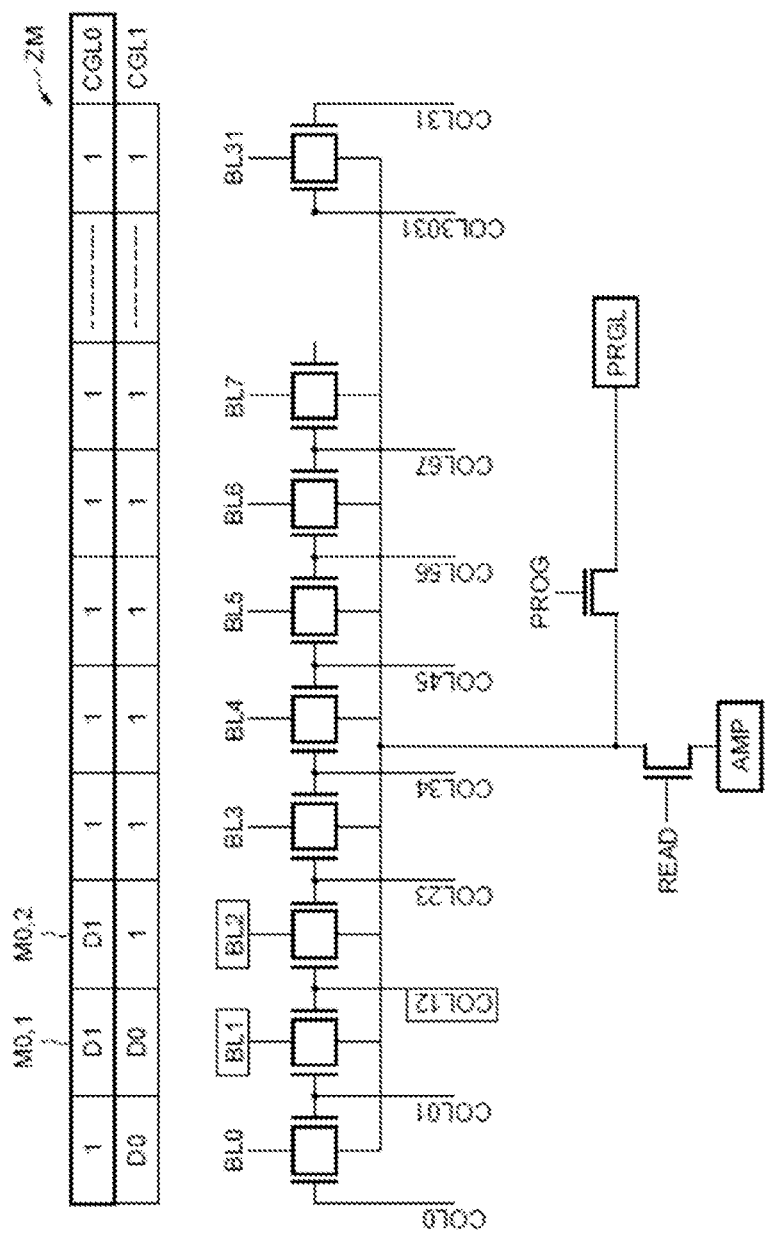

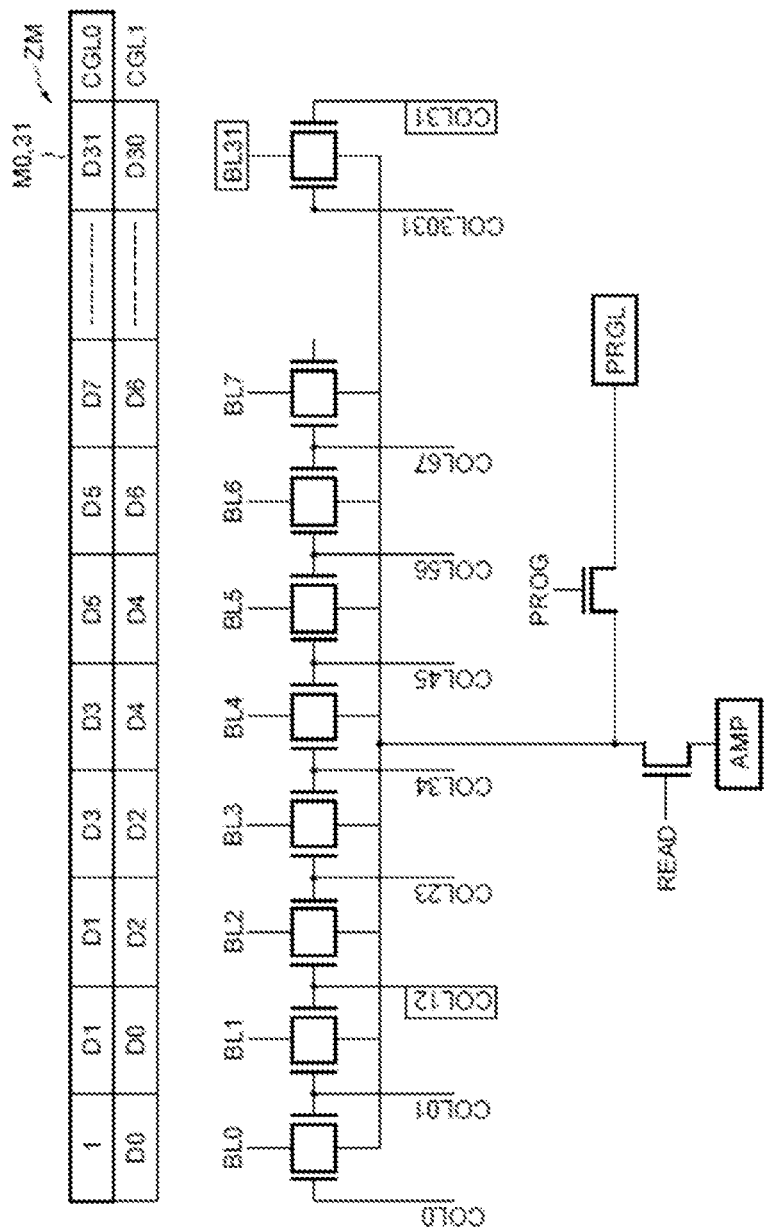
[Fig 18]

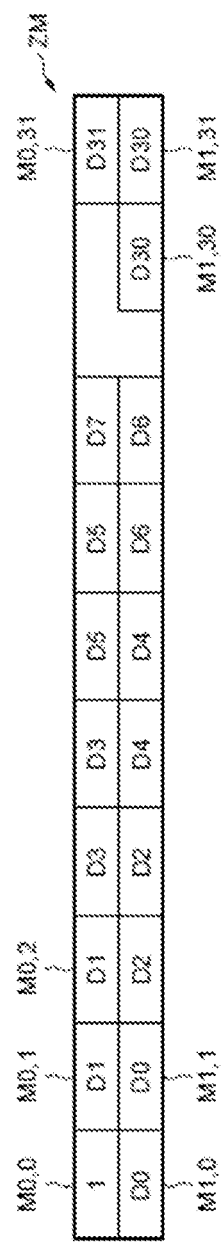
[Fig 19]

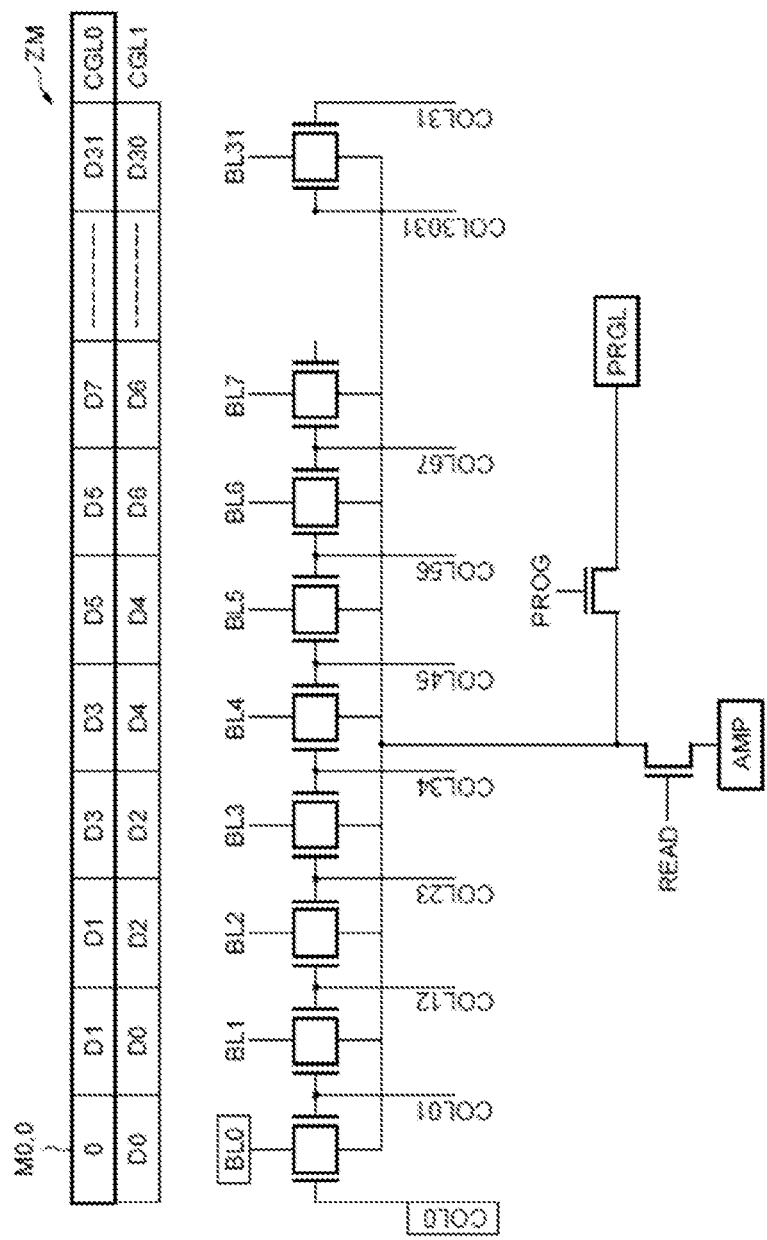
[Fig 20]

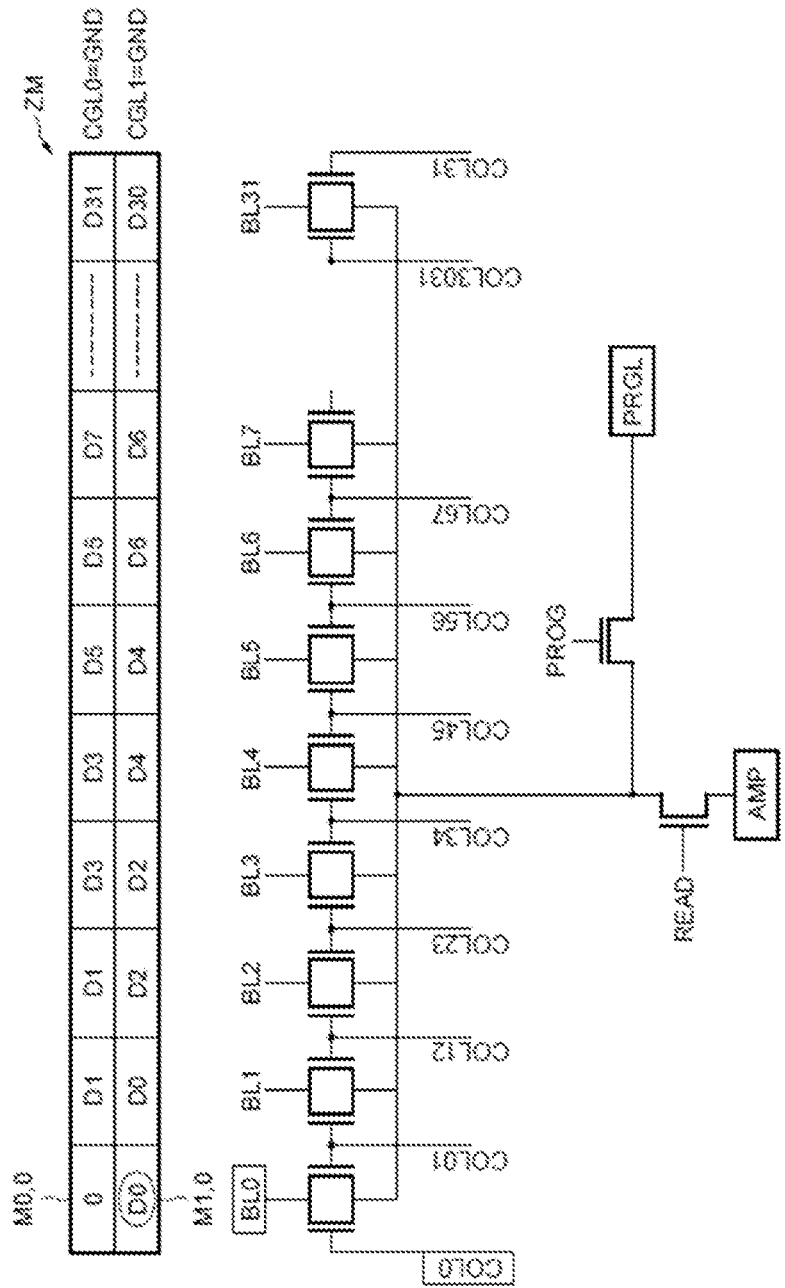
[Fig 21]

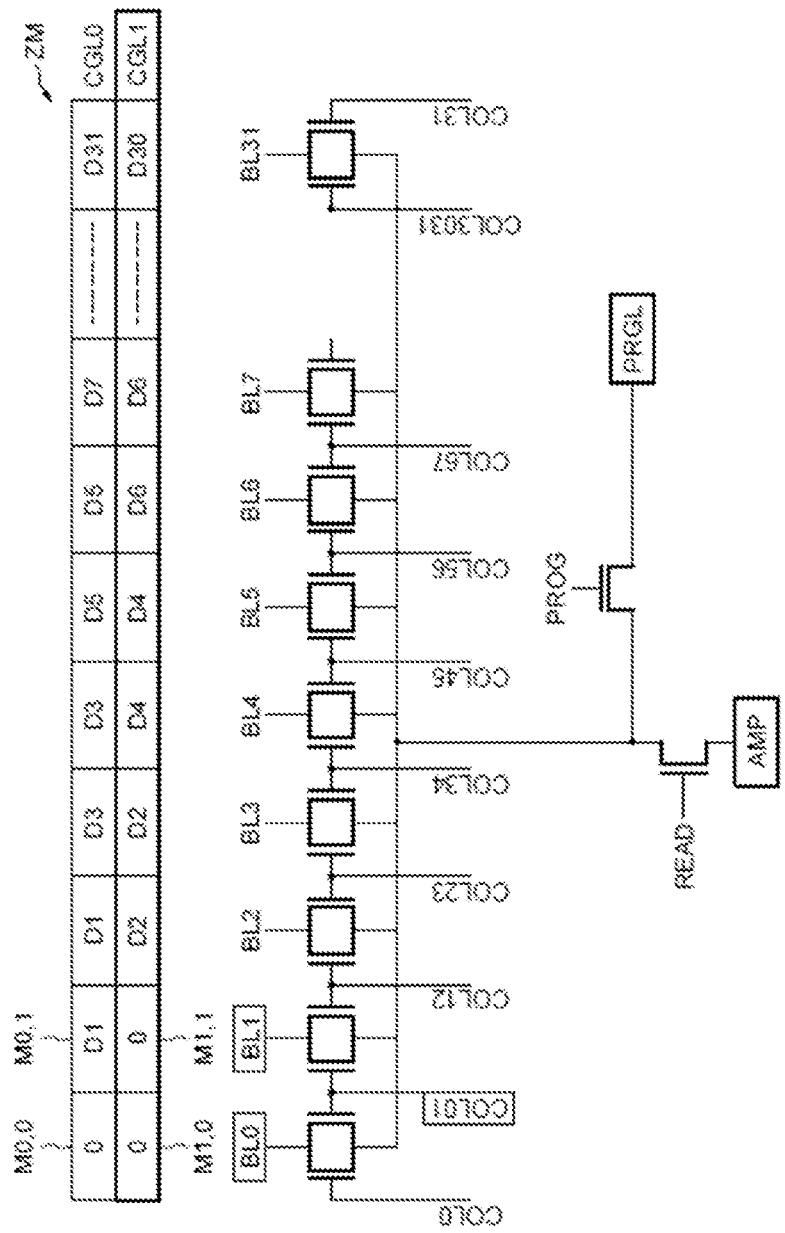
[Fig 22]

[Fig 23]
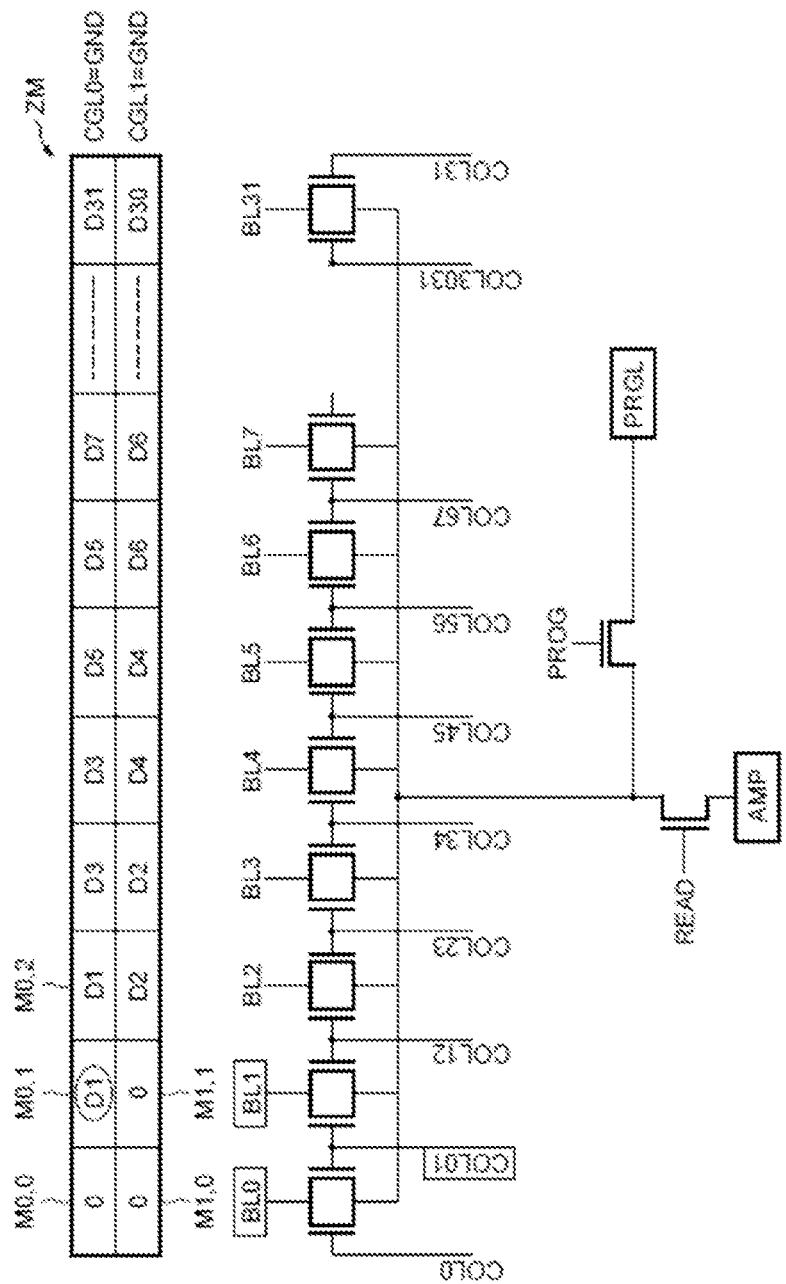

[Fig 24]
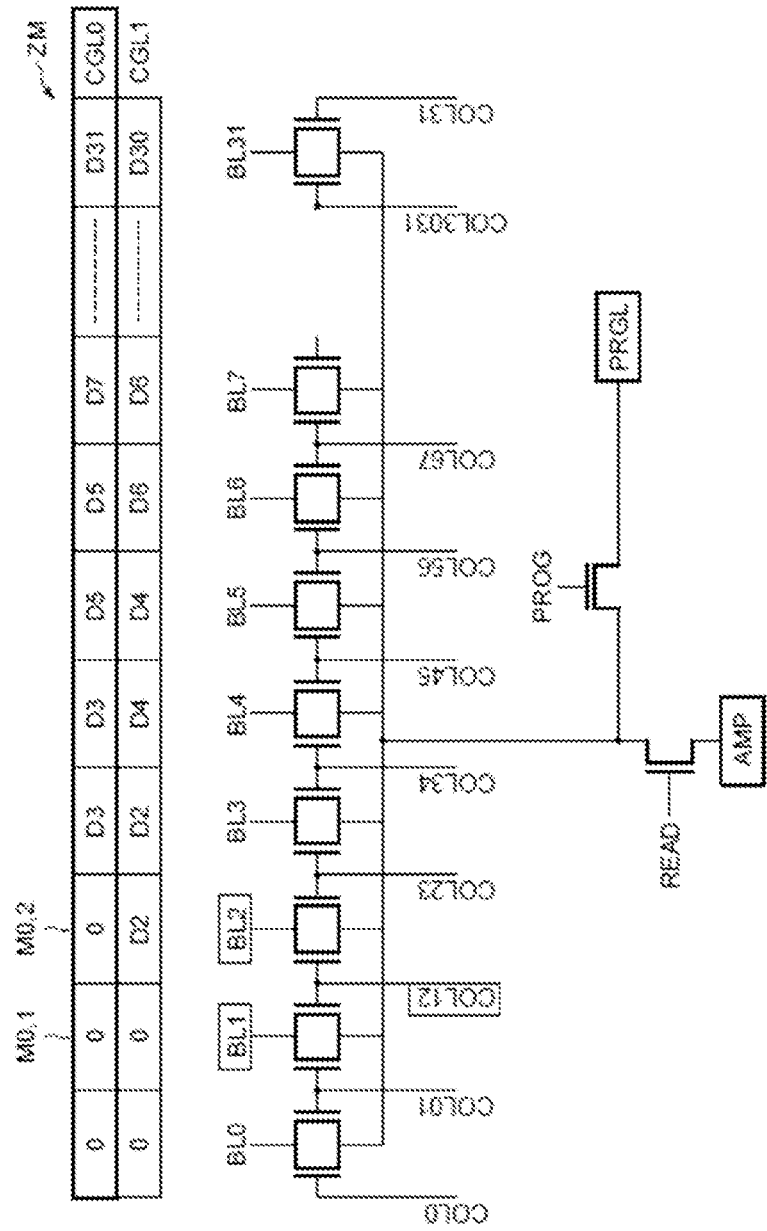

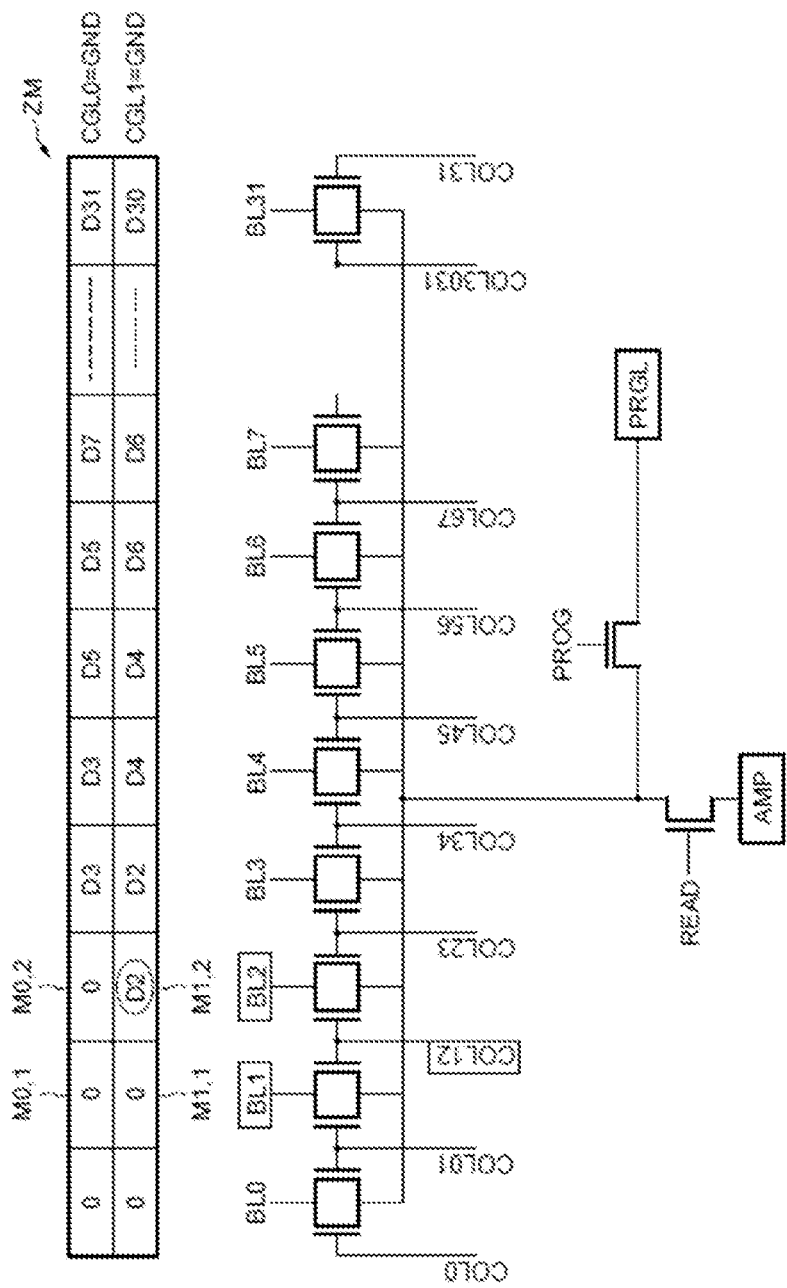
[Fig 25]

[Fig 26]
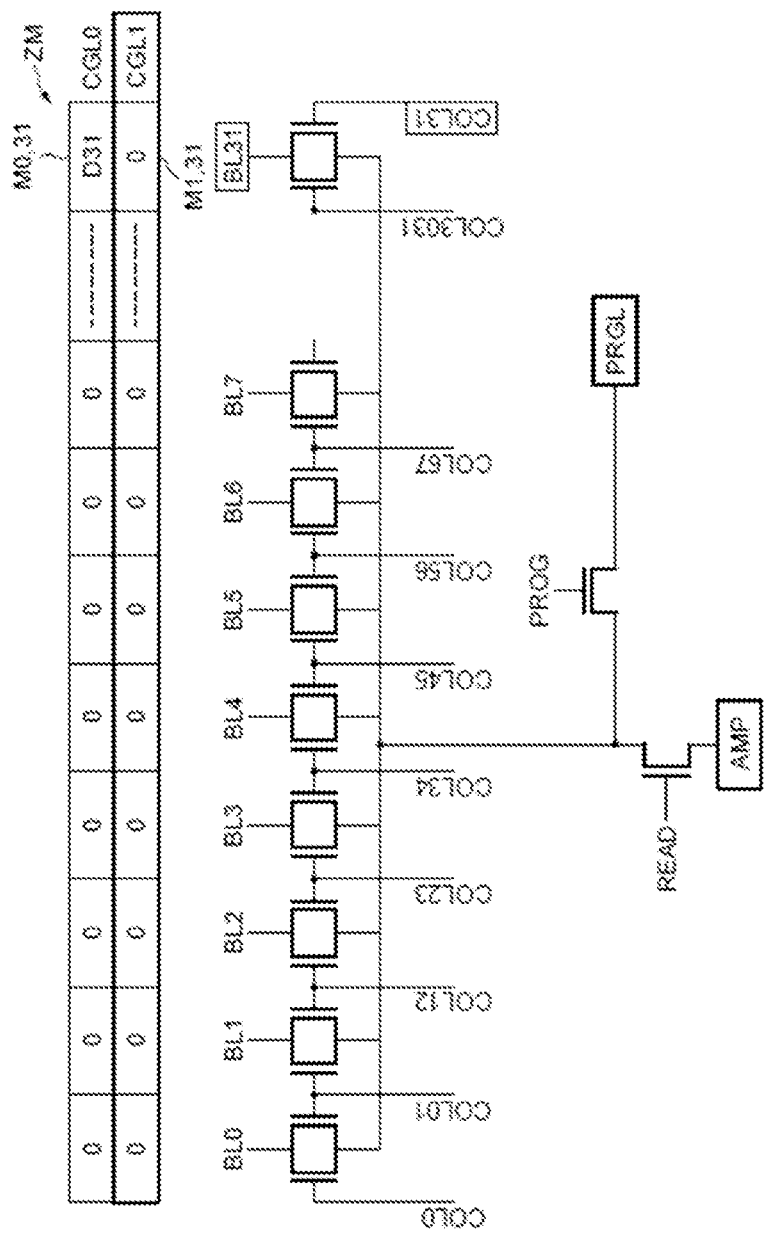

[Fig 27]
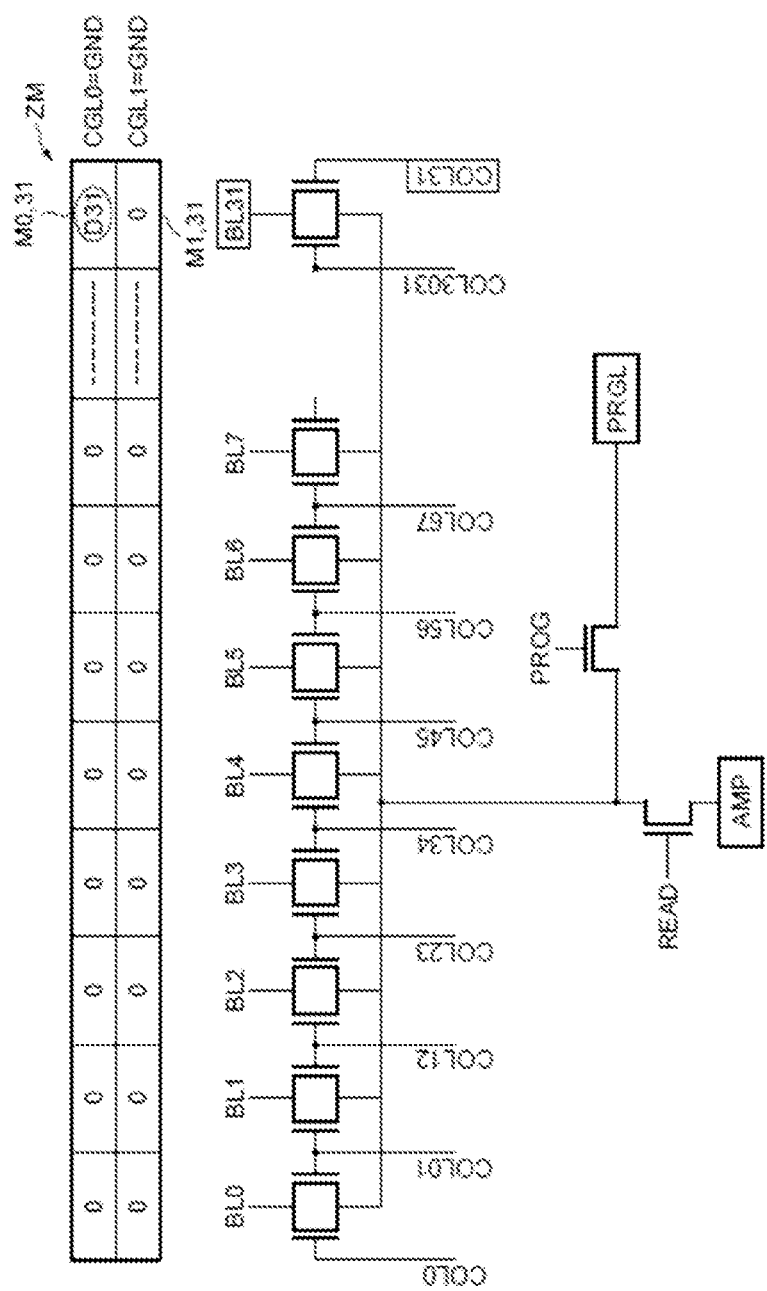

[Fig 28]
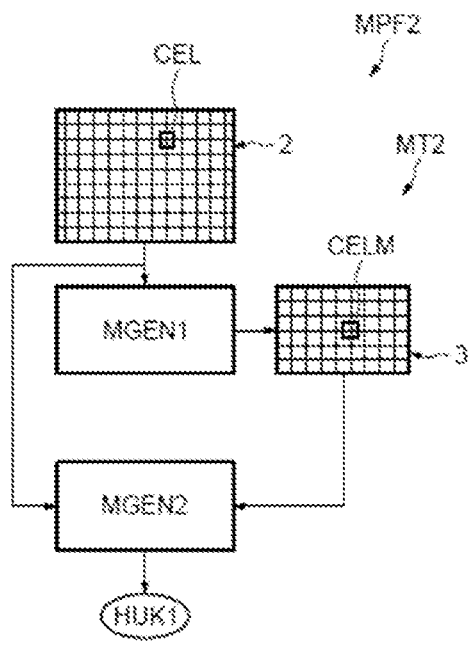
[Fig 29]
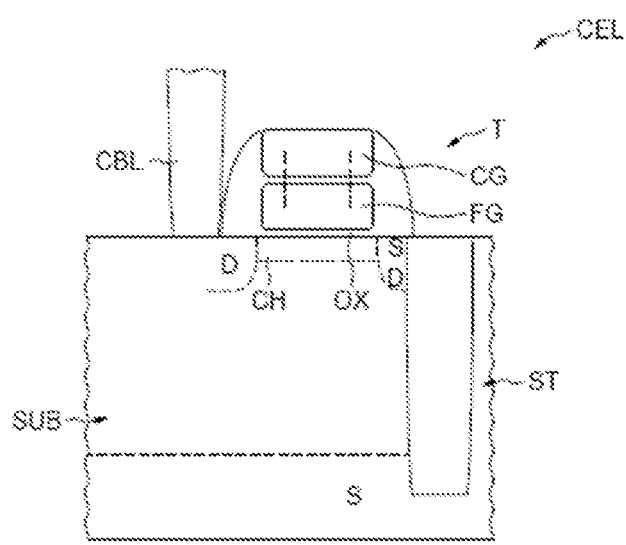

[Fig 30]
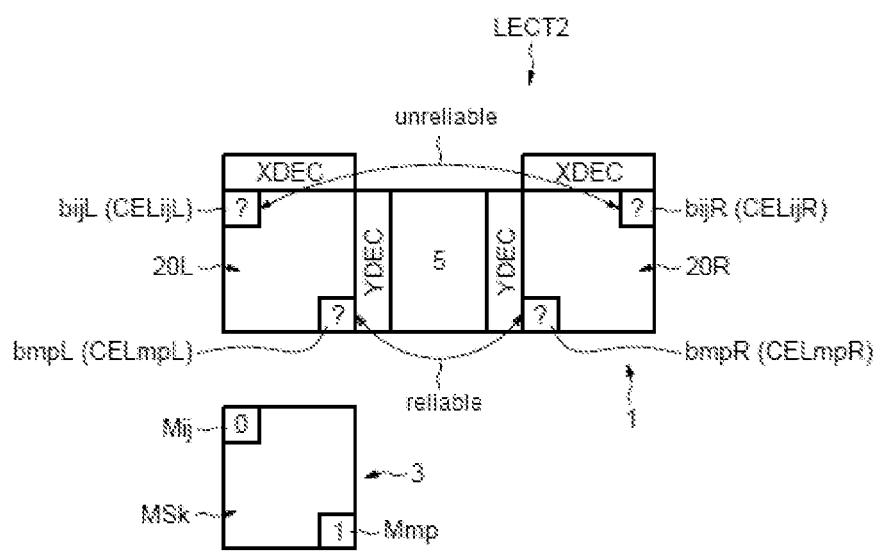

[Fig 31]
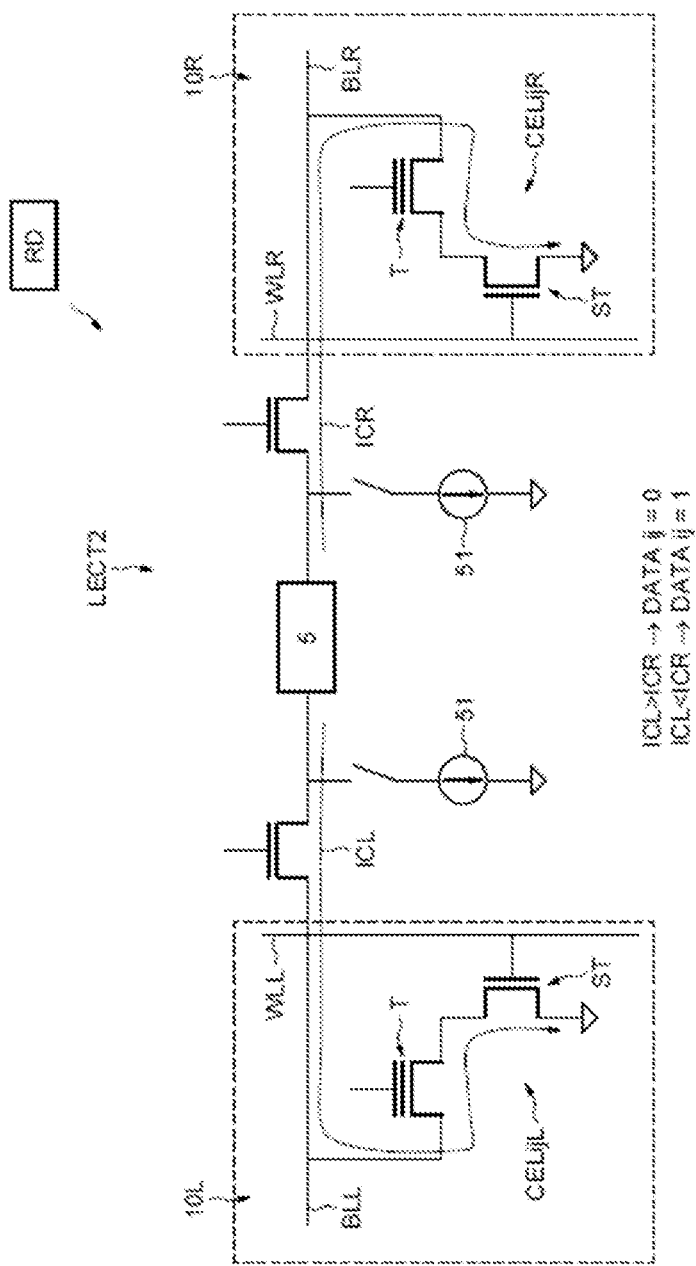

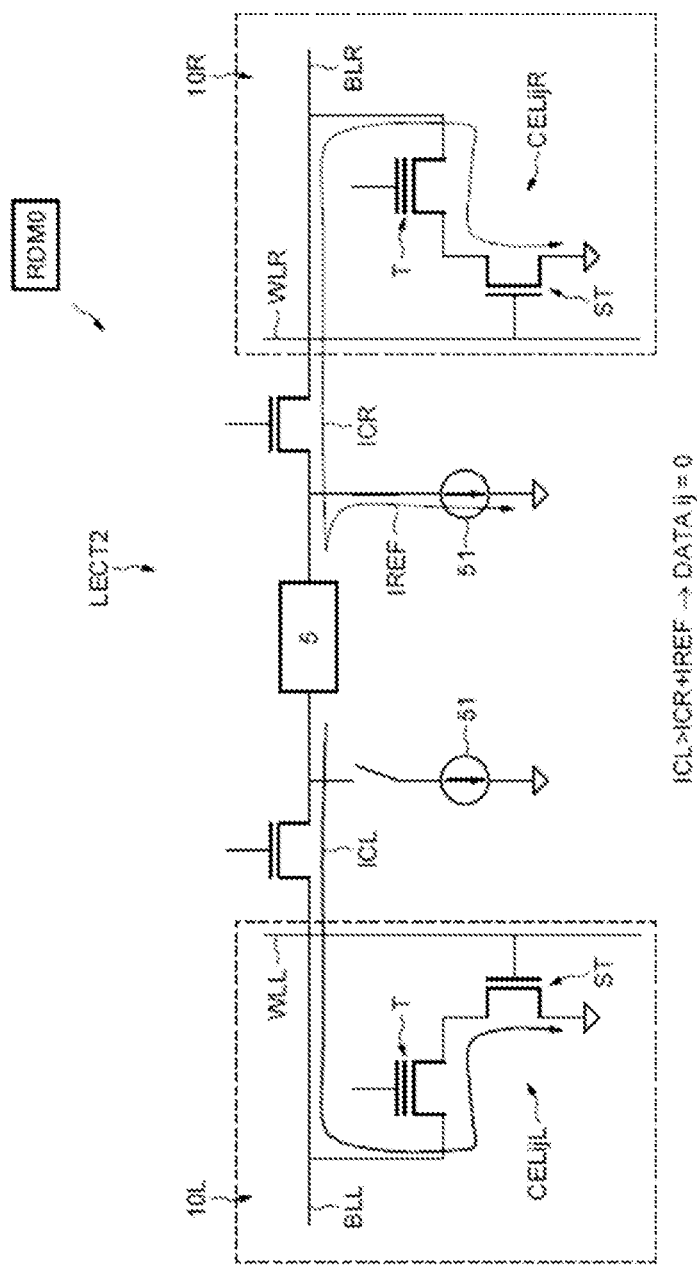
[Fig 32]

[Fig 33]
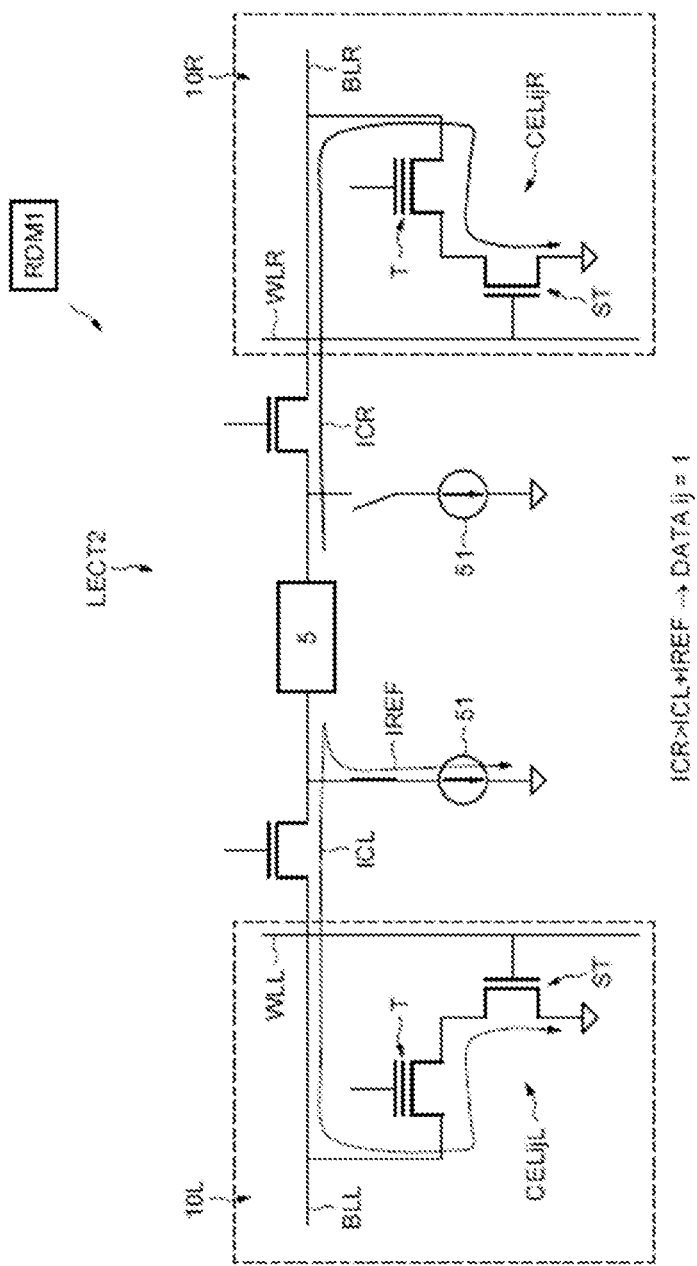

[Fig 34]
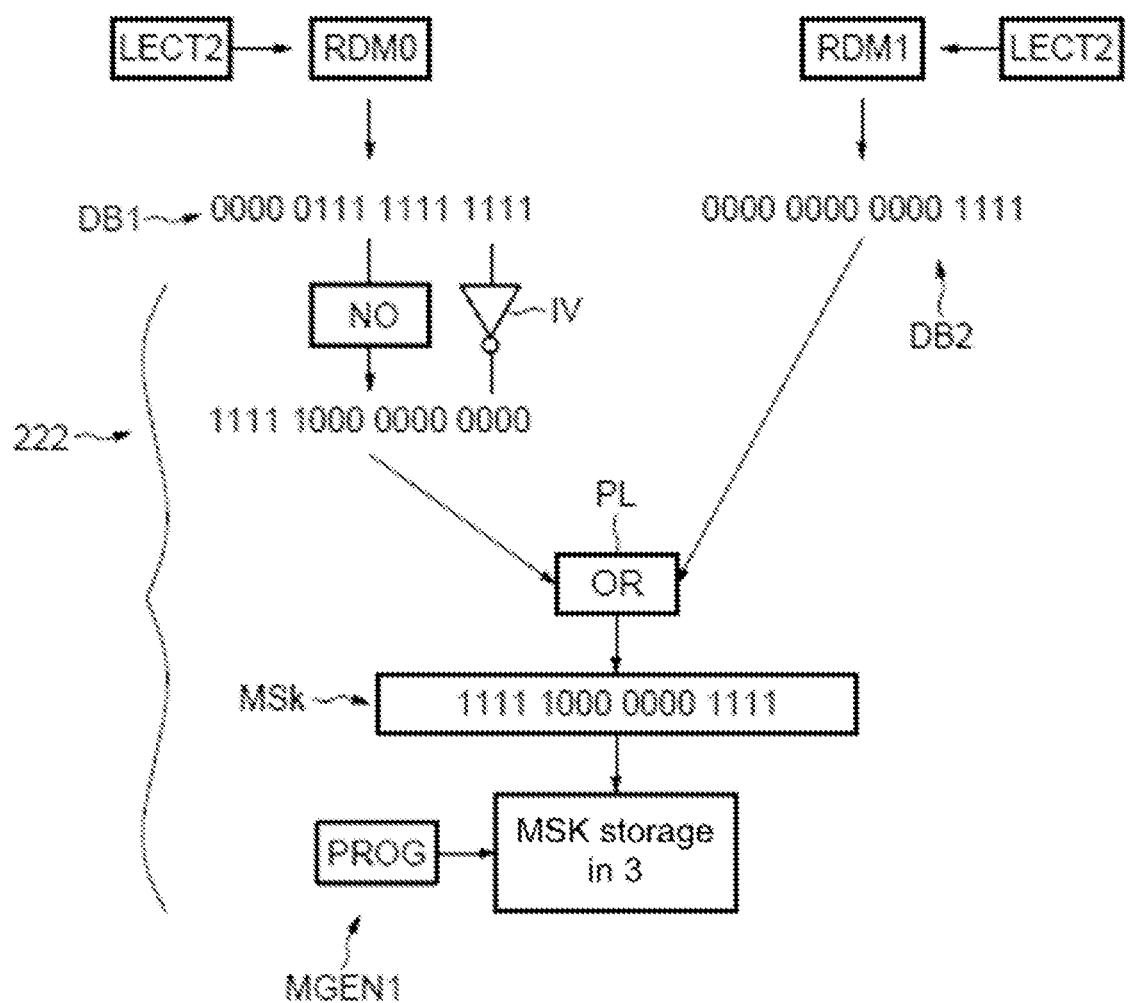

[Fig 35]
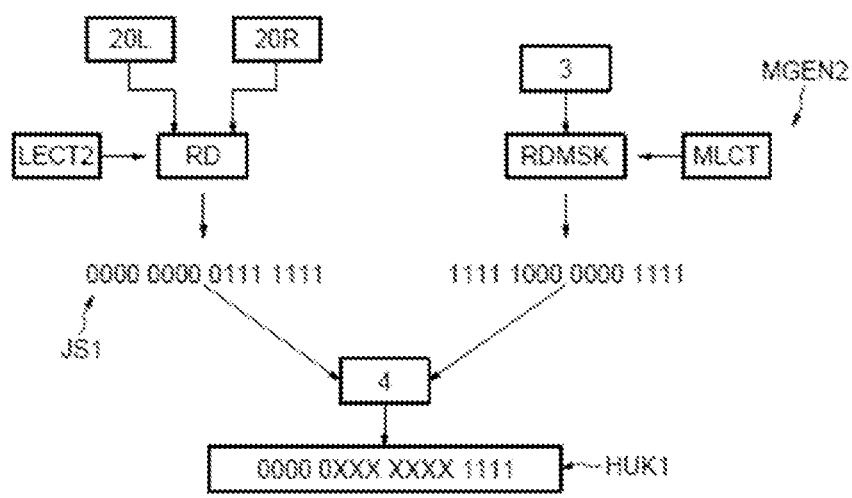

[Fig 36]
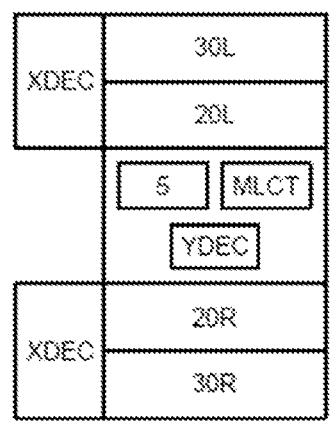

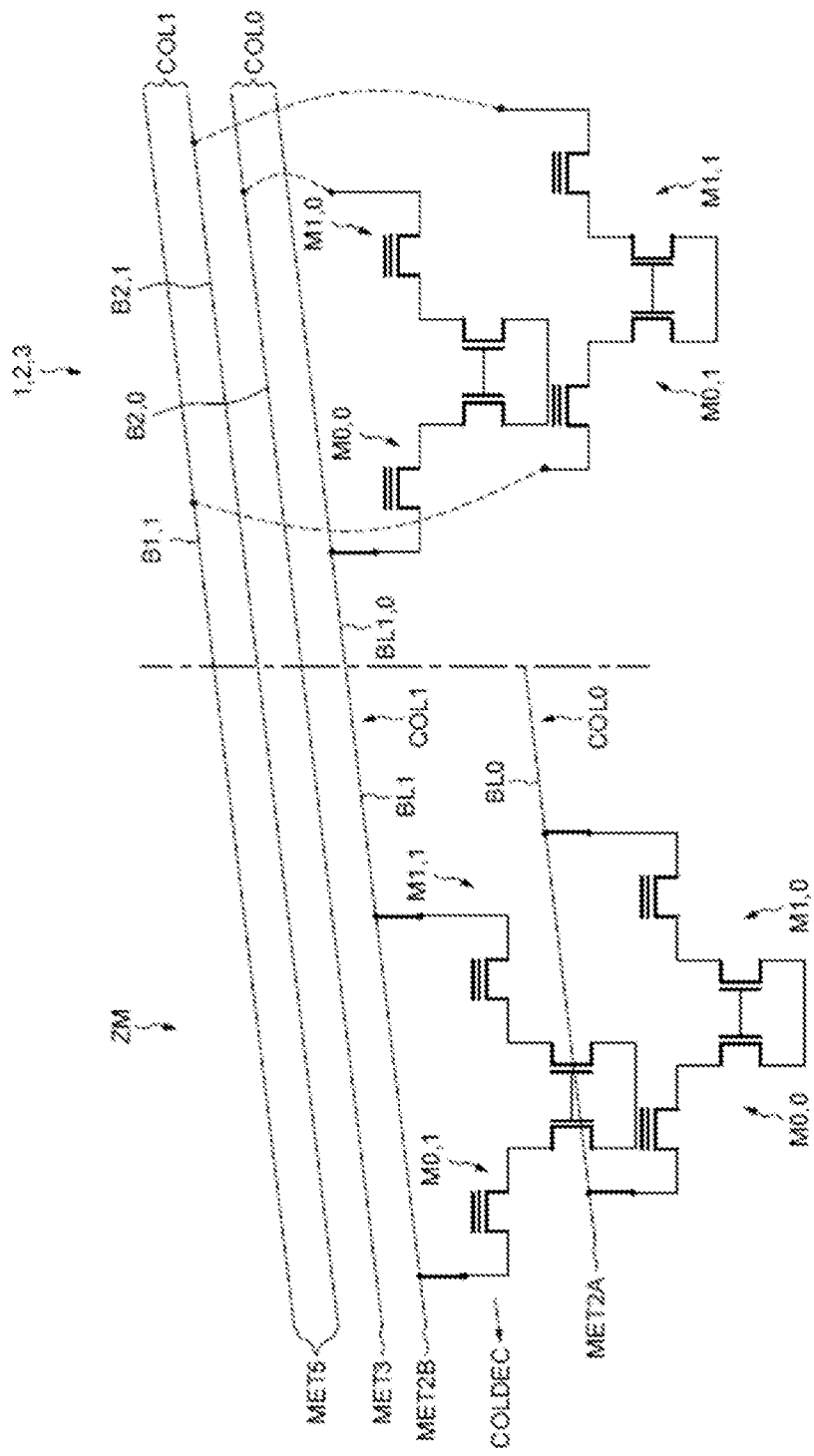
[Fig 37]

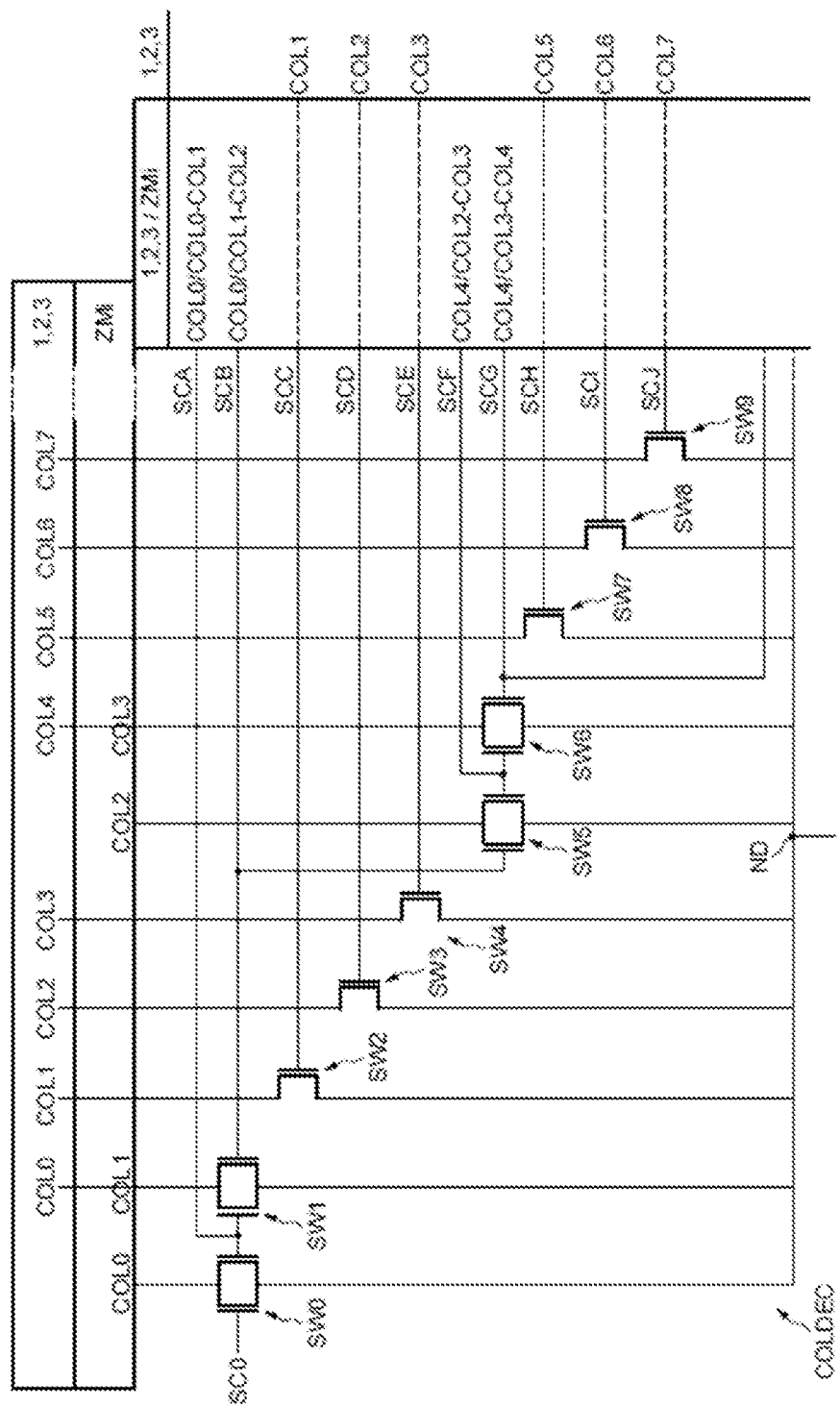
[Fig 38]

PHYSICALLY UNCLONABLE FUNCTION DEVICE

CROSS-REFERENCE TO RELATED APPLICATIONS

This application claims the benefit of French Patent Application No. 2107580, filed on Jul. 13, 2021, which application is hereby incorporated herein by reference.

TECHNICAL FIELD

Embodiments of the invention relate to physical unclonable functions (PUF), and more particularly those performed within an integrated circuit.

BACKGROUND

A physical unclonable function automatically generates a unique, unpredictable code that depends on random or partially random physical features of the physical unclonable function. These physical features can be caused by variations during the manufacture of the physically clonable function.

Thus, cloning such a function is very difficult if not impossible.

Moreover, the content of the generated code, which is unique because it differs from a physical unclonable function to another physical unclonable function, cannot be predicted and can depend, for example, on a particular configuration of components during the power-up of the function. Thus, for example, a physical unclonable function can be performed by a non-volatile memory which has a content upon power-up which depends on the partially random physical features of the memory, these manufacturing variations leading to different physical features for different memories.

SUMMARY

Embodiments provide for the random variations in the physical features to be easily identifiable in order to unambiguously distinguish between different data.

Further embodiments provide that the achievements of physical unclonable functions require little or no dedicated manufacturing steps.

Unique, unpredictable codes typically include a sequence of random data and are primarily used as encryption keys. These data are typically secret.

Physical unclonable functions can be performed using, for example, random access or non-volatile memories, or else ring oscillators or else specific logic circuits.

However, these devices of the prior art can in some cases be more or less easily detectable within the integrated circuit or else be sensitive to attacks by fault injection, or else to penalising surface bulk.

Embodiments provide a strengthening of the security of physical unclonable function structures, and in particular to propose physical unclonable function structures whose data are clearly discriminable in read mode, while being difficult to extract by attacks from third parties.

Embodiments provide for the structures to be easy to produce in existing technologies and to have a non-penalising surface bulk.

According to one embodiment provision is made of a physical unclonable function device which can only be used a predefined number of times, the device becoming inoperative after this number of times has been reached.

One possible, but not exclusive, application of such a device is, for example, a limitation on the number of possible pairings between apparatuses, for example printers, and objects, for example ink cartridges.

According to another embodiment, provision is made of a physical unclonable function device which can both deliver this unique unpredictable code, that can be used for example as an encryption/decryption key, a predefined number of times, and deliver another unique unpredictable code that can also be used, for example, as an encryption key an unlimited number of times.

Thus, according to this other embodiment, provision is made of a physical unclonable function device capable of providing for example a first key for limited use and a second key for unlimited use.

According to one aspect provision is made of an integrated device of physical unclonable function, comprising a first physical unclonable function module, internal to the device, configured to generate an initial data group, and management means, internal to the device, configured to generate an output data group from at least the initial data group, to authorise only D successive deliveries of the output data group on a first output interface of the device (that is to say outside the device), D being a non-zero positive integer, and to prevent any new generation of the output data group.

The output data group, that is to say the unique unpredictable code forming for example a first key of limited use, can be for example the initial data group generated by the first module, or else be obtained for example by a combination of this group of initial data and additional data which are themselves generated by a second physical unclonable function module.

The number D is determined, for example, by the sum of the number of uses of the device under test and the number of operational uses of the device by the final user.

Moreover, the first physical unclonable function module and the management means are internal to the integrated device, which makes the integrated device autonomous without it having to receive external data to deliver the output data group, that is to say the unique unpredictable code.

This makes the device even more robust.

According to one embodiment, the management means are configured to prevent any new generation of the output data group by preventing any new generation of the initial data group.

According to one embodiment, the first module comprise a first set of non-volatile memory cells each having a selection transistor buried in a semiconductor substrate and a depletion type state transistor, having a control gate and a floating gate, the state transistors having respective effective threshold voltages belonging to a common random distribution, and reading means configured to deliver the initial group of data from a reading of the effective threshold voltages of the state transistors of the memory cells of said first set.

This type of non-volatile memory cell with a buried selection transistor has a particularly compact structure. It was described in detail for example in patent application US 2013/0 228 846.

It is possible to read a memory cell of the first set by applying zero voltage to the control gate, for example by connecting this control gate to ground, because the state transistor is normally on.

Moreover, the state transistor being of the depletion type, the on character ("normally on") of the state transistor when the memory cell is for example in a virgin state and a zero voltage is applied to the control gate, is related to the value of the threshold voltage in the virgin state of this memory cell which can for example be selected negative or substantially zero.

As an indication, this threshold voltage can be of the order of −1 volts.

The state transistors of all memory cells in the first set have the same theoretical threshold voltage. But, it is the effective threshold voltages, that is to say the real values of the threshold voltages, which vary slightly according to the random dispersion, for example due to physical manufacturing distortions.

And, the common random distribution is advantageously a distribution of effective threshold voltages of state transistors of virgin memory cells that have never been written.

According to one embodiment, the first set of non-volatile memory cells is organised in first two matrix subsets disposed symmetrically relative to the reading means, all the lines of the first two matrix subsets being parallel, and the reading means are configured to perform said reading including differential readings of the effective threshold voltages of the state transistors of the pairs of symmetrical memory cells and located respectively in the first two subsets on homologous columns of these first two subsets.

Two homologous columns of the first two subsets are understood to be columns with the same column address.

The distribution of the first set into two symmetrical matrix subsets associated with the differential approach at the reading, is particularly advantageous in the sense that it allows to increase the dispersion within the common random distribution of the effective threshold voltages of the state transistors.

According to one embodiment, the management means are configured to program or erase the memory cells of one of the two subsets after the reading of the initial data group, so as to prevent any new generation of the initial data group.

Indeed, any new differential reading of the memory cells of the first set will provide a constant value, which is of course different from the initial data group generated.

Here the entropy source at the origin of the generation of the initial data group was therefore destroyed.

According to one embodiment, the initial data group includes G initial data and the management means comprise a non-volatile memory device including a memory plane including D memory areas, each memory area being configured to store a piece of information including a succession of N data including the G initial data, N being greater than or equal to G, and first processing means configured to successively extract the N data from the D memory areas of the memory means and to destroy at least part of the content of the corresponding memory area during the extraction of the N corresponding data.

The D memory areas, that each contain the initial data group (which is a random sequence of data), will allow the D successive deliveries of the output data group outside the device.

Moreover, it is possible to store in each memory area only the initial data group. In this case N is equal to G and the succession of N data stored in each memory area is the succession of G initial data.

This being the case, it would be possible to provide N greater than G. In this case, for example, the G initial data are completed by N-G dummy bits all having for example the value 1, in order to obtain the succession of N data stored in the memory area.

Each memory area also advantageously includes non-volatile memory cells with a buried selection transistor.

More specifically, according to one embodiment, each memory area includes a matrix of memory cells having two rows and N columns.

Each memory cell comprises a state transistor having a control gate and a floating gate, selectable by a vertical selection transistor buried in a substrate and including a buried selection gate.

Each column of memory cells includes a pair of twin memory cells.

Two memory cells are said to be twins when the two selection transistors of this pair of memory cells have a common selection gate.

The first processing means are configured to store in the memory area, said piece of information including the succession of N bits.

The storage of said piece of information is advantageously carried out so that, with the exception of the last bit of the succession, a current bit of said succession of bits is stored in two memory cells located on the same row and on two adjacent columns, and a current bit and the next bit are respectively stored in two twin cells.

Such a twin-cell structure, combined with this filling of the checkerboard type of the memory area and a redundant storage of the current bit in two memory cells, leads to robust storage of the piece of information and makes it difficult to restore the correct value of the bits of the piece of information, and therefore the correct value of the bits of the initial data group, in particular with a conventional method for reading these memory cells.

In this regard, in order to ensure correct reading of a bit, the first processing means are advantageously configured, in order to be able to read a bit stored in a first twin cell, to first replace the bit stored in the second twin cell with a reference bit having a reference value selected to allow correct restoration of the value of the bit stored in the first twin cell. This reference value is for example the logical value 0 corresponding to a programmed state of the twin memory cell.

Indeed, since the two twin cells are selected simultaneously, the value of the bit stored in the second twin cell must not possibly "mask" (for example if this value is equal to 1) the value of the bit stored in the first twin cell.

Moreover, the first processing means are also advantageously configured to sequentially read the N bits of the piece of information and, for each bit of the succession except the last, replace a current bit already read of said piece of information with the reference bit, before being able to read the next bit of said succession.

Such a reading with replacement of each bit already read with the reference bit, before being able to read the next bit of the piece of information, amounts to "destroying" the bits as they are read, with the exception of the last one, and therefore makes impossible a new restoration of the stored piece of information, and consequently a new restoration of the initial data group.

Each memory area can therefore only be read once in order to deliver the stored piece of information only once.

Consequently, the D memory areas will only authorise D restorations of the initial data group and therefore D deliveries of the unique unpredictable code.

According to one embodiment, the memory area includes a single bit line per column connected to the drains of the state transistors of the pair of twin cells of the corresponding column, and one gate control line, per row of memory cells, connected to all the control gates of the state transistors of the memory cells of the corresponding row.

According to one embodiment, the first processing means comprise a column decoder configured to individually select the two bit lines associated with the two columns located at the two ends of the memory area and, to simultaneously select two adjacent bit lines, for both the operation of storing the piece of information and the operation of reading and replacing the bits beforehand.

Such a non-limiting example of a column decoder allows to implement the particular storage and reading mentioned above.

The memory cells of the memory areas are cells with one bit line per column, while the other memory cells of the device are memory cells with two bit lines per column.

While it would be possible to provide separate column decoders for each type of architecture (single bit line or double bit line), it is particularly advantageous to provide a single column decoder structure compatible with both architectures. This will be explained in more detail below.

In a first variant, the output data group, that is to say the unique, unpredictable, limited-use code delivered by the physical unclonable function device, can simply comprise the N bits of said piece of information stored in a memory area.

However, in order to make the device even more robust against attacks, it is possible to combine the N bits of the piece of information stored in each memory area with a group of additional data generated by a second physical unclonable function module.

Thus, according to another variant, the management means comprise a second physical unclonable function module configured to generate a group of additional data, and development means configured to develop the output data group from at least the initial data group and at least the additional data group.

However, this group of additional data can also act on its own as a unique unpredictable code, which can be used, for example, as an encryption/decryption key.

The device may then be able to deliver D times a first unpredictable unique code (the output data group) and to deliver a very large, unlimited number of times, a second unpredictable unique code (the group of additional data).

More specifically, according to one embodiment, the management means are configured to deliver on a second output interface of the device (this second output interface possibly being identical or different from the first output interface) the group of additional data.

According to one embodiment, the second physical unclonable function module comprises a second set of non-volatile memory cells each having a selection transistor buried in a semiconductor substrate and a depletion type state transistor having an electrically connected control gate and a floating gate, the state transistors having respective effective threshold voltages belonging to a common random distribution, and second processing means configured to deliver the group of additional data from a reading of the effective threshold voltages of the state transistors of the memory cells of said second set.

The non-volatile memory cells with buried selection transistor of the second set may be of the type of those described in patent application US 2013/0 228 846.

But, here, compared to these conventional cells, the state transistors of the memory cells of the second set may be of the depletion type and have a control gate and a floating gate which are electrically connected.

These features are particularly advantageous because, as for the memory cells of the first set (that is to say those of the first physical unclonable function module), it is then possible to read a memory cell of the second set by applying zero voltage on the control gate, for example by connecting this control gate to ground, because the state transistor is normally on.

Furthermore, since there is zero reading voltage on the control gate, no stress is induced during reading ("read stress") in the gate dielectric, which allows to greatly reduce, or even remove the risk of the occurrence of a phenomenon known to the person skilled in the art under the term "read disturb" which may result in a modification of the logical value of the stored bit.

This is particularly advantageous for those memory cells which are likely to be read a very large number of times.

Moreover, the state transistor being of the depletion type, the on character ("normally on") of the state transistor when the memory cell is for example in a virgin state and a zero voltage is applied to the control gate, is related to the value of the threshold voltage in the virgin state of this memory cell which can for example be selected negative or substantially zero.

As an indication, this threshold voltage can be of the order of −1 volts.

Again, the state transistors of all memory cells have the same theoretical threshold voltage. But, it is the effective threshold voltages, that is to say the real values of the threshold voltages, which vary slightly according to the random dispersion, for example due to physical manufacturing distortions.

But as the control and floating gates of the state transistors are electrically connected, the state transistors by nature have greater variability against these distortions and therefore a wider distribution than other types of electronic components, for example MOS transistors or resistors.

Thus these cells of the second set offer a very wide dispersion of the effective threshold voltages.

The dispersion obtained from the effective threshold voltages is for example equal to −1 volts plus or minus 100%.

And, the common random distribution is advantageously a distribution of effective threshold voltages of connected state, floating-gate and control transistors, of blank memory cells that have never been written.

Advantageously, each memory cell of the second set includes a gate oxide disposed between the floating gate of the state transistor and the substrate, the thickness of this gate oxide being greater than 8 nanometres, for example comprised between 8 and 10 nanometres.

Such a thick gate oxide allows to obtain a good robustness of the physical unclonable second function module against ageing.

According to one embodiment, the second processing means include second reading means configured to perform said reading of the effective threshold voltages of the state transistors and the second set of non-volatile memory cells is organised in second two matrix subsets disposed symmetrically relative to the reading means, all the lines or rows of the second two matrix subsets being parallel.

Moreover, the second reading means are configured to perform said reading which then includes differential readings of the effective threshold voltages of the state transistors of the pairs of symmetrical memory cells and respectively located in the second two subsets on the homologous columns of these second two subsets.

Again, two homologous columns of the second two subsets are understood to be columns with the same column address.

In a manner similar to what has been indicated for the first set, the distribution of the second set into two symmetrical matrix subsets associated with the differential approach at the reading, is particularly advantageous in the sense that it allows to increase the dispersion within the common random distribution of the effective threshold voltages of the state transistors.

It is further particularly preferable to ensure the reliability of the memory cells of the second set so as to keep for the delivery of the group of additional data, only the pairs of memory cells of the second set whose content is reliable that is to say not liable to vary from one power-up to another.

Also, according to one embodiment, the second processing means advantageously include a third set of memory cells each having a selection transistor buried in a semiconductor substrate and a state transistor having a control gate and a floating gate, the memory cells of the third set being intended to contain pieces of reliability information representative of the reliability or unreliability of the contents of the pairs of memory cells of the second set.

Unlike the memory cells of the second set, the memory cells of the third set, which are intended to contain the pieces of reliability information, do not include state transistors having their floating gate and their control gate electrically connected. On the other hand, these state transistors are also advantageously of the depletion type.

Thus, just as it is possible (as indicated above) to read a memory cell of the second set by applying a zero voltage to the control gate, for example by connecting this control gate to ground, because the state transistor is normally on, it is also possible to read a memory cell of the third set by applying a zero voltage to the control gate because the state transistor of such a cell is also advantageously normally on.

In other words, the memory cells of the third set are conventional memory cells with a state transistor and a buried selection transistor, for example of the type of those described in the aforementioned United States patent application, but with for example an arsenic implant in the channel region so as to obtain depletion type state transistors.

According to one embodiment, the third set includes a matrix arrangement of memory cells sharing the same columns as those of the matrix arrangement of memory cells of the second set.

Thus, this facilitates the decoding because the second set and the third set then share the same column decoding.

Moreover, it is further advantageous for the third set also to include two third subsets respectively distributed on either side of the second subsets.

Moreover, the pieces of reliability information associated with the pairs of memory cells are stored in memory cells of the third set located on the same columns as those on which said corresponding pairs of memory cells of the second set are located.

Such symmetrical storage of the pieces of reliability information on either side of the second subsets allows easier reading.

According to one embodiment, the second processing means include first generation means configured to generate said pieces of reliability information by taking into account a margin value on the differential readings of the effective threshold voltages of the state transistors of the pairs of memory cells of the second set.

According to one embodiment, the second processing means comprise second generation means configured to generate said group of additional data at least from the differential readings of the effective threshold voltages of the state transistors of the pairs of memory cells of the second set, and said pieces of reliability information of these pairs of memory cells.

As indicated above, according to one embodiment, the first set of memory cells, the second set of memory cells and the third set of memory cells each have an architecture including two bit lines per column of memory cells.

In other words, the columns of these memory cells include pairs of twin memory cells, the two selection transistors of a pair of twin memory cells having a common selection gate, two adjacent twin memory cells of the same column not being connected to the same bit line and two adjacent non-twin memory cells of the same column being connected to the same bit line.

According to one embodiment, some columns of the non-volatile memory device (including the D memory areas) are common with some columns of the first, second and third sets.

The management means then advantageously include a single column decoder configured to individually select the two bit lines associated with the two columns located at the two ends of each memory area and to simultaneously select two adjacent bit lines of each memory area and a bit line of the first, second and third sets common to one of these two adjacent bits, and to individually select the other bit lines of the first, second and third sets.

As indicated above, such a column decoder structure is compatible with the architecture with one bit line per column of the non-volatile memory device and with the architecture with double bit line per columns of the sets of memory cells of the first and second physical unclonable function modules.

According to another aspect, provision is made of a method for automatically generating a unique unpredictable code at said first output interface of a physical unclonable function device as defined above, comprising a power-up of the device and at least one reading of a memory area of the non-volatile memory device.

According to one embodiment, the method further comprises reading the effective threshold voltages of the state transistors of the memory cells of said second set, the control gates of the state transistors of these memory cells being connected to ground during said reading, and a development of the unique unpredictable code from the content of the memory area read and the group of additional data obtained from said reading.

According to another aspect, provision is made of a method for producing a physical unclonable function device as defined above, comprising producing the device within an integrated circuit, and during a test phase of the integrated circuit, generating the initial data group,
storing said piece of information of N data in the D memory areas,
programming or deleting part of the memory cells of the first set after generating the initial data group,
generating and storing a piece of reliability information.

BRIEF DESCRIPTION OF THE DRAWINGS

Other advantages and features of the invention will become apparent upon examining the detailed description of non-limiting implementations and embodiments, and of the appended drawings wherein:

FIG. 1 shows an integrated circuit device;

FIG. 2 shows a method for making an integrated circuit device;

FIG. 3 describes a method for generating a code according to an embodiment;

FIG. 4 illustrates a method for using the integrated device according to an embodiment;

FIG. 5 illustrates a non-volatile memory cell of a divided gate type;

FIG. 6 illustrates a two twin cell according to an embodiment;

FIG. 7 illustrates a memory plane structure with a single bit line per column;

FIG. 8 illustrates a structure of a memory plane and of twin memory cells called double bit lines;

FIG. 9 shows a set of non-volatile memory cells organized in two matrix subsets according to an embodiment;

FIG. 10 describes a reading means configured to perform a differential reading;

FIG. 11 shows a method for destroying a code;

FIG. 12 illustrates a two twin cell according to another embodiment;

FIG. 13 schematically shows different threshold voltages corresponding to erased, blank and programmed memory cells, respectively;

FIG. 14 illustrates a column decoder configured to individually select two bit lines associated with two columns located at two ends of the memory area;

FIG. 15 illustrates that, prior to storing of a piece of information in the memory area, all memory cells of the memory area are in an erased state;

FIG. 16 illustrates a column decoder configured to select two bit lines according to an embodiment;

FIG. 17 illustrates a column decoder configured to select two bit lines according to another embodiment;

FIG. 18 illustrates a column decoder configured to select two bit lines according to yet another embodiment;

FIG. 19 illustrates a checkerboard filling of the memory area at the end of a write operation;

FIG. 20 illustrates a replacement of a value stored in a twin cell before reading the cell;

FIG. 21 illustrates the reading of two twin cells according to an embodiment;

FIG. 22 illustrates a correct restoration of the logical value of a datum;

FIG. 23 illustrates a selection of two bit lines according to an embodiment;

FIG. 24 shows, prior to reading, programming the cells;

FIG. 25 shows reading the cells;

FIG. 26 shows programming the twin cell;

FIG. 27 shows reading the cell;

FIG. 28 shows a second processing means including a third set of memory cells;

FIG. 29 shows a cell of the third set including a state transistor having a control gate and a floating gate;

FIG. 30 shows a second set of non-volatile memory cells;

FIG. 31 illustrates reading means configured to perform a differential reading with a margin value;

FIG. 32 illustrates reading means configured to perform a differential reading with a margin value;

FIG. 33 shows another reading means configured to perform a differential reading;

FIG. 34 describes an example of a structure of a first generation means configured to generate pieces of reliability information;

FIG. 35 describes an example of a structure of a second generation means configured to generate a code;

FIG. 36 illustrates a third set of memory cells configured to store pieces of reliability information;

FIG. 37 shows a metallization to BL relationship; and

FIG. 38 shows columns of a memory plane of the memory areas.

DETAILED DESCRIPTION OF ILLUSTRATIVE EMBODIMENTS

Before returning in more detail to the various constituents of a physical unclonable function device, a general architecture and operation example will be described with reference to FIGS. 1 to 4.

In FIG. 1, the reference DIS denotes an integrated device with a physical unclonable function, advantageously produced entirely within a single integrated circuit IC.

The device DIS comprises a first physical unclonable function module MPF1, internal to the device DIS, configured to generate an initial data group RD2, typically a sequence of random binary data forming a unique unpredictable initial code.

As will be seen in more detail below, the first module MPF1 includes a first set 1 of memory cells intended to generate the initial code RD2.

The device DIS also comprises management means MGST, internal to the device DIS, configured to generate an output data group HUK2 from at least the initial data group RD2, authorise only D successive deliveries of the output data group HUK2 on a first output interface INST1 of the device, D being a non-zero positive integer, and prevent any new generation of the output data group HUK2.

This output data group HUK2 forms a first unpredictable unique code, that can be used for example as an encryption/decryption key.

This first code HUK2 is therefore of limited use because it can only be delivered D times.

As will be seen in more detail below, the management means are configured to prevent any new generation of the output data group HUK2 by preventing any new generation of the initial data group RD2.

The management means MGST comprise a non-volatile memory device DM having a memory plane including D memory areas ZM1-ZMD.

Each memory area is capable of storing N bits.

In the example described here, it is assumed that the initial data group RD2 also includes N bits.

As indicated above, in the case where the group RD2 includes GM bits, with G less than N, it would be possible to complete the G bits with N-G dummy bits.

Each memory area ZMi is therefore configured here to store the succession of N data of the initial code RD2.

And as will be seen in more detail below, the memory device DM includes first processing means (not shown in this FIG. 1) configured to successively extract the N data of the code RD2 from the D memory areas of the memory means and to destroy at least part of the content of the corresponding memory area during the extraction of the N corresponding data.

While it would be possible for the first unpredictable unique code HUK2 to be the initial code RD2, it is preferable to improve the robustness of the device DIS against attacks from malicious third parties, to combine the initial code RD2 with a group of additional data forming a second unique unpredictable code HUK1.

In this regard, the management means MGST include development means MLB, for example a logic circuit of the EXCLUSIVE OR type, developing the first code HUK2 from the initial code RD2 and from the second code HUK1.

The management means MGST also include a second physical unclonable function module MPF2 configured to generate the second code HUK1.

As will be seen in more detail below, the second module includes a second set 2 of memory cells intended to generate the code HUK1 using a piece of reliability information MSK contained in a third set 3 of memory cells.

It is also possible for the second module MPF2 to deliver the second code HUK1 on a second output interface INTS2 of the device, this second output interface INTS2 possibly being the first output interface INTS1 or else a different output interface.

The second code HUK1 can for example be used as an encryption/decryption key.

The second code HUK1 can be an unlimited code.

Manufacture and Use of the Physical Unclonable Function Device

Reference is now made more particularly to FIG. 2 to illustrate an example of a method for manufacturing the device of FIG. 1, allowing use thereof.

The steps mentioned in FIG. 2 are general steps which for some of them will be explained in more detail below.

These steps are part of a first phase PH1 which is typically a test phase known to the person skilled in the art by the acronym EWS ("Electrical Wafer Sorting").

Once the integrated circuit incorporating the device DIS has been produced, the device DIS is powered up (step ST20).

Then the initial code RD2 is generated (step ST21) which is respectively stored D times in the D memory areas ZM1-ZMD (step ST23).

Any new generation of the initial code RD2 is then prevented (step ST23).

The number D is determined based on the necessary number of times the device DIS is used during the functional test of the device and the maximum number of times the device is used by the final user.

Indeed, after D deliveries of the code HUK2 by the device DIS will no longer be able to deliver the code HUK2.

In addition to the steps just mentioned, the method comprises in step ST24, generating pieces of reliability information MSK and storing it in the set 3 of memory cells (step ST25).

At the end of this first phase PH1, the device DIS is ready for use.

FIG. 3 describes a first embodiment allowing the generation of the code HUK2.

The code HUK1 is generated (step ST31) after power-up of the device DIS in a step ST30.

This generation can be triggered automatically or in response to an internal control generated by a control unit (software or state machine for example) internal to the device.

The code HUK1 is then stored for example in internal registers (step ST32).

After reception, in step ST33, of another internal control HUK2CMD, for example also generated by the control unit, and if the code HUK2 has not already been generated D times (step ST34), step ST36 is carried out wherein the initial code RD2 is read in one of the memory areas ZMi still available.

If, on the other hand, the code HUK2 has already been generated D times, then a new generation and a new delivery of the code HUK2 is impossible (step ST35).

After reading in step ST36 the initial code RD2, the code HUK2 is generated in step ST37 from the initial code RD2 and the stored code HUK1.

Moreover, as will be seen in more detail below, reading the initial code RD2 in the memory area ZMi automatically results in its destruction in the memory area ZMi (step ST38).

The code HUK2 is then delivered to the first output interface INST1 of the device DIS.

The code HUK2 is therefore a limited use code because it can only be generated D times.

FIG. 4 illustrates another example of the use of the device DIS.

In this example, after powering up the device DIS in step ST40, the code HUK1 is generated in step ST41. Then delivered to the output interface INST2 (step ST42).

Again, this generation of HUK1 can be triggered automatically or in response to an internal control generated by the internal control unit of the device.

These steps can be repeated an unlimited number of times.

The key HUK1 is therefore not for limited use.

Reference is now made more particularly to FIG. 5 and subsequent in order to describe in more detail some constituents of the device DIS of FIG. 1.

Memory Cells Used in the Physical Unclonable Function Device

As indicated above, the device DIS comprises memory areas ZMi and various sets 1, 2 and 3 including memory cells.

These memory cells are non-volatile cells of the divided gate type.

In FIG. 5, the reference M denotes such a non-volatile memory cell of the divided gate type, for example of the selection transistor type having a vertical gate buried in the substrate of an integrated circuit.

More specifically, the memory cell M includes a state transistor T including a floating gate FG surmounted by a control gate CG connected to a gate control line CGL.

The drain (D) of the state transistor T is connected to a bit line BL while the source (S) of the state transistor T is connected to the drain of a selection transistor ST.

The selection transistor ST includes a gate CSG connected to a word line WL.

The source (S) of the selection transistor ST is connected to a source line SL.

As illustrated in FIG. 6, each state transistor of a memory cell cooperates with the selection transistor ST which is vertical and buried in the substrate SB.

The channel ZCH of the state transistor is referenced ZCH.

The selection transistors ST connected to the two state transistors Ti,j and Ti+1,j each have a vertical channel ZCV and a buried vertical common selection gate CSG. It should be noted that for the sake of simplification of the figure, the contact allowing to connect the common buried gate CSG to the corresponding word line WLi,i+1, is not shown.

FIG. 6 illustrates more specifically two twin cells Mi,j and Mi+1,j belonging to the same column j and to the two lines i and i+1.

The state transistor is here a state transistor of the depletion type as described in the French patent application published under the n° 3049380.

As is well known to the person skilled in the art, the depletion MOS transistor is on without a control voltage applied to the control gate of the state transistor (control gate connected to ground), and consequently to the floating gate by capacitive coupling. The state transistor is therefore said to be "normally on". On the other hand, the transistor becomes less and less conductive as the control voltage present on the control gate increases in absolute value (becomes more and more negative) to finally be off beyond a blocking voltage.

The channel ZCH of the state transistor is advantageously a surface channel so that it may be possible to be able to block the conduction of the channel by applying an acceptable control voltage to the control gate of the state transistor.

The implantation energy of the dopants defines the depth of the channel ZCH. As an indication, this energy can be comprised between 5 keV and 100 keV, then leading to a channel depth of the order of 100 nm.

In the case of an N conductivity type channel, the implanted dopants can be for example arsenic As, and the concentration of dopants determines the threshold voltage Vth0 of the state transistor of a memory cell at the virgin state. The state transistor is here configured to have such a negative threshold voltage Vth0. In this regard, it is possible to use a dose of implanted dopants comprised between 1012 atoms/cm$^2$ and 1014 atoms/cm$^3$.

With such a dose of dopants it is possible to obtain a negative voltage Vth0 of, for example, comprised between −1 volt and −0.5 volts.

Memory Plane Structures Used in the Physical Unclonable Function Device

With such memory cells, different memory plane structures are possible, namely a structure with a single bit line per column or a structure with two (or double) bit lines per column.

The memory plane of the memory device DM including the D memory areas ZMi has a structure with one bit line per column, while the sets 1, 2 and 3 have a structure with double bit lines per column.

Memory Plane Structure with One Bit Line Per Column

By way of example, FIG. 7 represents a memory plane structure PM with a single bit line per column and comprising memory cells Mi,j; Mi,j+1; Mi−1,j; Mi−1,j+1 of the type described in patent application US 2013/0228846.

The memory cells Mi,j and Mi,j+1 of rank "i" belong to the line or row of rank i of the memory plane and are connected to a word line WLi−1,i and to a gate control line CGLi.

The memory cells Mi−1,j and Mi−1,j+1 of rank "i−1" belong to the line or row of rank "i−1" of the memory plane and are connected to the word line WLi−1,i and to a gate control line CGLi−1.

The memory cells Mi,j and Mi−1,j of rank "j" belonging to the column j are readable and writable via a single bit line BLj and the memory cells Mi,j+1 and Mi−1,j+1 of rank "j−1" are readable and writable via a single bit line BLj+1.

Each memory cell includes a floating gate transistor FG, respectively Ti,j; Ti,j+1; Ti−1,j; Ti−1,j+1. The drain regions (D) of the transistors Ti,j and Ti−1,j are connected to the bit line BLj and the drain terminals of the transistors Ti,j+1 and Ti−1,j+1 are connected to the bit line BLj−1. The control gates CG of the transistors Ti,j and Ti,j+1 are connected to the gate control line CGLi and the control gates CG of the floating gate transistors Ti−1,j and Ti−1,j+1 are connected to the gate control line CGLi−1.

Each floating gate transistor has its source terminal (S) connected to a source line SL through the selection transistor ST. The selection transistors ST of the memory cells Mi,j and Mi−1,j have a common selection gate CSG and the two memory cells are, therefore, called "twins". Likewise, memory cells Mi,j+1 and Mi−1,j+1 are twin memory cells and their selection transistors ST have a common selection gate CSG.

Each selection gate CSG is a vertical gate buried in a substrate wherein the memory plane PM is produced, the source line SL also being buried. These common selection gates CSG of twin memory cells are connected to the word line WU−1,i.

Memory Plane Structure with Two Bit Lines Per Column

FIG. 8 illustrates a structure of a memory plane and of twin memory cells called "double bit lines" (two bit lines per column).

The memory plane PM comprises rows and columns of memory cells, eight memory cells C1,j, C2,j, C3,j, C4,j, C1,j+1, C2,j+1, C3,j+1, C4,j+1 being represented here. Each memory cell includes a state transistor, respectively referenced T1,j, T2,j, T3,j, T4,j, Ti,j+1, T2,j+1, T3,j+1, T4,j+1, and a selection transistor ST connected between a source plane SL and the state transistor.

The memory cells C1,j, C2,j, C3,j, C4,j belong to a column of rank j and the memory cells C1,j+1, C2,j+1, C3,j+1, C4,j+1 belong to an adjacent column of rank j+1. The memory cells C1,j, C1,j+1 belong to a first row of memory cells, and their state transistors T1,j, T1,j+1 have control gates CG1 connected to a common gate control line CGL1. The memory cells C2,j, C2,j+1 belong to a second row of memory cells, and their state transistors T2,j, T2,j+1 have control gates CG2 connected to a common gate control line CGL2. The memory cells C3,j, C3,j+1 belong to a third row of memory cells, and their state transistors T3,j, T3,j+1 have control gates CG3 connected to a common gate control line CGL3. The memory cells C4,j, C4,j+1 belong to a fourth row of memory cells and their state transistors T4,j, T4,j+1 have control gates CG4 connected to a common gate control line CGL4.

In the column of rank j, the memory cells C1,j, C2,j are twin memory cells and their selection transistors ST include a common selection gate CSG1,2 connected to a common word line WL1,2.

Likewise, the memory cells C3,j, C4,j are twin memory cells and their selection transistors ST include a common selection gate CSG3,4 connected to a common word line WL3,4.

In the column of rank j+1, the memory cells C1,j+1, C2,j+1 are twin memory cells and their selection transistors ST include a common selection gate CSG1,2 connected to the word line WL1,2.

The memory cells C3,j+1, C4,j+1 are twin memory cells and their selection transistors ST include a common selection gate CSG3,4 connected to the common word line WL3,4.

The common selection gates CSG1,2 or CSG3,4 of the pairs of twin memory cells are vertical buried gates made in the shape of conductive trenches made in the substrate, and the source terminals (S) of the selection transistors ST are connected at the buried source plane SL, extending below the region of the substrate where the memory cells are implanted.

The memory plane PM comprises two bit lines per column of memory cells. Thus, two bit lines B1,j, B2,j are allocated to the memory cells of the column of rank j, and two bit lines B1,j+1, B2,j+1 are allocated to the memory cells of the column of rank j+1.

Two twin memory cells are connected to different bit lines among the two bit lines allocated to the column wherein they are located, while two adjacent but not twin memory cells are connected to the same bit line.

Thus, in the column of rank j:
the drain terminal (D) of the state transistor T1,j is connected to the bit line B1,j via a conductive path 1A,
the drain terminal of the state transistor T2,j is connected to the bit line B2,j via a conductive path 23B,
the drain terminal of the state transistor T3,j is connected to the bit line B2,j via the conductive path 23B (the memory cell C2,j being adjacent but not twin to the memory cell C3,j), and
the drain terminal of the state transistor T4,j is connected to the bit line B1,j via a conductive path 4A.

In the column of rank j+1:
the drain terminal of the state transistor Ti,j+1 is connected to the bit line B1,j+1 via a conductive path 1C,
the drain terminal of the state transistor T2,j+1 is connected to the bit line B2,j+1 via a conductive path 23D,
the drain terminal of the state transistor T3,j+1 is connected to the bit line B2,j+1 via the conductive path 23D (the memory cell C2,j+1 being adjacent but not twin to the memory cell $C_3$,j+1), and
the drain terminal of the state transistor T4,j+1 is connected to the bit line B1,j+1 via a conductive path 4C.

Column and Line Decoders

As will be seen below, the various components of the device DIS use column and line decoders to select the memory cells.

It is possible to use specific column decoders for each component. Some of these decoders may have a conventional structure. The column decoder associated with the non-volatile memory device DM has a specific structure.

This being the case, as will be seen in more detail at the end of the description with reference to FIGS. 37 and 38, it is particularly advantageous to provide a single column decoder capable of addressing the various memory planes.

This allows to simplify the overall architecture of the device and to reduce the bulk on silicon.

Line decoders, in turn, have a conventional structure.

The First Physical Unclonable Function Module MPF1 and its Operation

Reference is now made more particularly to FIGS. 9 to 11 in order to describe in more detail an exemplary embodiment of the first module MPF1 with a physical unclonable function intended to generate the initial unpredictable code RD2.

As indicated above, the first module MPF1 includes a first set of memory cells.

Each memory cell has the features described with reference to FIG. 6.

The state transistor being of the depletion type, the normally on character of the state transistor when the memory cell is in a virgin state and a zero voltage is applied to the control gate is related to the value of its threshold voltage in the virgin state of the memory cell which can be selected negative or substantially zero.

The state transistor of a memory cell in the virgin state is here configured to have such a negative threshold voltage, for example of the order of −1 volts.

All the memory cells of this first set 1 are in the virgin state.

All the state transistors of all the cells of the first set 1 are intended to have the same threshold voltage.

However, the effective threshold voltages, that is to say the actual values of the threshold voltages, vary slightly according to a random dispersion, for example due to physical manufacturing distortions. This type of dispersion is usual and known per se.

Thus, the transistors of the cells of the first set 1 each have an effective threshold voltage belonging to a common random distribution.

And this common random distribution here is a distribution of threshold voltages of transistors of virgin memory cells that have never been written.

Now if reference is more particularly made to FIG. 9, it can be seen that in this advantageous embodiment, the first set 1 of non-volatile memory cells CEL is organised in first two matrix subsets 10L and 10R disposed symmetrically relative to reading means LECT of conventional structure known per se, typically including sense amplifiers 5.

All the lines or rows of the first two matrix subsets 10L and 10R are parallel.

The line decoding of each of these two subsets 10L, 10R is performed by line decoders XDEC of conventional structure known per se, while the column decoding of these first two subsets is performed by two column decoders YDEC, also of conventional structure known per se, disposed symmetrically relative to the sense amplifiers 5.

And, these reading means LECT are configured to perform differential readings of the effective threshold voltages of the state transistors of the pairs of symmetrical memory cells CELijL and CELijR located respectively in the first two subsets 10L and 10R on homologous columns of these first two subsets.

Reference is now made more particularly to FIG. 10 to describe a differential reading RD carried out by reading means LECT incorporating the sense amplifiers 5.

In the example illustrated in FIG. 10, the reading means LECT are configured to measure the difference between the effective threshold voltages of the pair of state transistors T belonging respectively to the two memory cells CELijL and CELijR.

The reading means are coupled to the transistors T via the respective bit lines BLL and BLR.

The selection transistors ST are controlled on their gate by signals conveyed on the respective word lines WLL and WLR.

A differential reading RD such as that illustrated in FIG. 10 is advantageously carried out with the control gates of the state transistors connected to ground.

The sense amplifier 5 is configured to amplify a difference between the current ICL flowing in the cell CELijL and the current ICR flowing in the cell CELijR.

Since these read currents ICL and ICR are representative of the effective threshold voltages of the floating gate transistors of the respective cells CELijL and CELijR, the difference of these currents is representative of the difference between the effective threshold voltages of these state transistors.

Thus, the reading means LECT are capable of measuring the difference between the effective threshold voltages of the pairs of state transistors of two cells disposed on corresponding bit lines.

And, by way of non-limiting example, it can be decided that if the current ICL is greater than the current ICR, then the datum DATAij contained in this pair of cells has a logical value 0 while if the current ICL is less than the current ICR, then this datum has a logical value 1.

Of course, the reverse convention could have been adopted.

Thus the differential reading RD of the memory cells of the first set 1 provides the initial code RD2.

Once this code RD2 has been generated, it is destroyed for example as illustrated in FIG. 11.

More specifically, the management means may in this regard include programming means MPROG of conventional structure, configured to program the memory cells of the first subset 10L or else those of the second subset 10R.

Thus a subsequent differential reading of the cells of this first set will provide a series of constant values.

Alternatively, it would be possible to replace the programming means by erasing means of conventional structure configured to erase the memory cells of the first subset 10L or else those of the second subset 10R.

The Non-Volatile Memory Device DM and its Operation

Reference is now made more particularly to FIGS. 12 to 27 to describe in more detail an example of the structure of the non-volatile memory device DM and its operation.

Such an example is described in the French patent application filed in the name of the Applicant on the same day as the present application and having the title: "Non-volatile memory device readable only a predetermined number of times".

The contents of this other patent application are for all practical purposes incorporated by reference into this patent application.

Some features thereof are recalled here.

The memory plane structure PM of the memory device DM is a structure with only one bit line per column as described in FIG. 7.

FIG. 12 illustrates more precisely two twin cells Mi,j and Mi+1,j belonging to the same column j and to the two lines i and i+1.

Their drain is connected to the same bit line BLj which is the only bit line for column j.

Each memory cell has the features described with reference to FIG. 6.

Each memory cell has a first state, for example an erased state, wherein it stores a bit having a first logical value, for example the logical value 1, and a second state, for example a programmed state, wherein it stores a bit having a second logical value, for example the logical value 0.

The state transistor of a memory cell is advantageously configured to be on when the memory cell is in its first state and to be off when the memory cell is in its second state.

FIG. 13 schematically shows the different threshold voltages Vthe, Vth0 and Vthp corresponding respectively for example to erased, blank and programmed memory cells.

In read mode, it is possible to apply a zero read voltage to the control gate CG of the state transistor and apply a positive voltage to the bit line BL.

Since the state transistor is depleted with a negative voltage Vth0, it is normally on for a blank memory cell, that is to say when no charge is present in the floating gate.

It can then be seen from FIG. 13 that a state transistor of an erased memory cell will be on while the state transistor of a programmed memory cell will be off. And, the fact of applying zero voltage to the control gate and therefore to the floating gate FG of the state transistor, does not induce read stress.

Moreover, the programming or erasing of a floating-gate transistor is carried out here by the injection or the extraction of the electric charges in the gate of the transistor by injection of hot electrons by means of high voltage(s).

More specifically, the erasure of a memory cell is achieved by combining a positive voltage applied to the substrate with a negative voltage applied to the control gate of its state floating gate transistor.

For the twin cell, if it is not desired to be simultaneously erased, a positive voltage is applied to the control gate of its state transistor.

The programming of a memory cell can be ensured for example by applying a positive voltage to the bit line concerned, by applying a zero voltage to the substrate, and a positive voltage to the control gate of its floating-gate state transistor.

The selection of such a memory cell to be programmed is performed by applying a positive voltage greater than the threshold voltage of the state transistor, to the word line concerned.

Regarding the twin cell, if it is not desired to be simultaneously programmed, a weakly negative voltage, for example –0.5 Volt or –1 Volt, or zero is applied to the control gate of its state transistor.

Finally, as indicated above, the reading of a memory cell is ensured by applying a zero voltage to the control gate CG of its state transistor, as well as a positive voltage to the corresponding bit line.

The selection of such a memory cell to be read is performed by applying a positive voltage greater than the threshold voltage of the state transistor, to the word line concerned.

In practice, a zero voltage will be applied in read mode to all the cells of the memory plane.

Therefore, two selected twin cells will be simultaneously read.

And if in addition the column decoder is configured, as will be seen in more detail below, to simultaneously select two adjacent bit lines, the two corresponding pairs of twin cells will be simultaneously read.

Reference will now be made more particularly to FIGS. 14 to 27 in order to describe more precisely embodiments and implementations of the memory device DM.

In FIG. 14, for the sake of simplification, only one memory area ZM was shown and only the operation of this memory area will be described, it being understood that the structure and operation of the D memory areas ZM1-ZMD of the memory device DM are identical.

This memory area ZM here contains a matrix of memory cells Mi,j having two rows or lines L0 and L1 and N columns, here 32 columns.

In this example, i denotes the row or line index and i is 0 or 1.

The index j denotes the column index and ranges from 0 to 31 in this example.

The memory area ZM is intended to store a piece of information including N binary data D0-D31.

It is considered here that the N binary data D0-D31 are those of the initial code RD2 generated by the first module MPF1.

The memory device DM also includes first processing means MTR1 including in particular a line decoder DECR, of conventional structure, and configured to deliver voltages on the word line WL0,1 as well as on the gate control lines CGL0 and CGL1.

The processing means also include a column decoder DECC.

This column decoder DECC here includes a set of switches SW0-SW31 each including two parallel MOS transistors.

A first terminal of the switch SWj is connected to the corresponding bit line BLj.

A second terminal of the switch SWJ is connected either to a sense amplifier circuit AMP by means of a MOS transistor controlled on its gate by a read signal READ or else to a programming means PRGL, of conventional structure, by means of another MOS transistor controlled on its gate by a programming control signal PROG.

These READ and PROG signals are delivered by the first processing means MTR1 depending on whether this is a reading phase or a programming phase.

As illustrated in FIG. 14, the column decoder DECC is configured to individually select the two bit lines BL0 and BL31 associated with the two columns located at the two ends of the memory area ZM, through the logic signals COL0 and COL31.

Moreover, the column decoder is also configured to simultaneously select two adjacent bit lines BLj and BLj+1 by the logic signal COLjj+1.

This individual selection of the two bit lines BL0 and BL31 and the simultaneous selection of two adjacent bit lines is carried out both for the operation of storing the piece of information D0-D31 in the memory cells of the memory area ZM and for the read operation which, as will be seen in more detail below, includes prior bit replacements with a reference bit, in this case a bit of logical value 0.

The logic signals COL0, COL31 and COL jj+1 are delivered by logic means MCC.

As indicated above, the memory area is intended to store 32 bits of data D0-D31 of the code RD2.

And, as illustrated in FIG. 15, prior to the storage of this piece of information (code RD2) in the memory area ZM, all the memory cells of the memory area ZM are in an erased state, that is to say that they all contain the logical value 1.

Reference is now made more particularly to FIGS. 16 to 19 to illustrate the successive writing of the N bits D0-D31 of the piece of information (code RD2) in the memory area ZM.

In general, since the initial state of the memory cells of the memory area ZM is an erased state, that is to say containing a logical "1", no operation will be carried out in a memory cell for writing therein a datum with the logical value "1".

On the other hand, a programming operation of a memory cell will be performed in the case where the datum to be written in this cell is a "0".

The voltages to be applied to the bit line, the substrate, the control gate and the word line to select and program a cell were indicated above.

Likewise, the voltages to be applied to the bit line, the control gate and the word line for selecting and reading a cell were indicated above.

In FIG. 16, the column decoder DECC selects, using the logic signal COL1, the two bit lines BL0 and BL1.

Moreover, the gate control line CGL1 is selected.

As a result, the datum D0 is written both in the memory cell M1,0 and in the memory cell M1,1.

Then, as illustrated in FIG. 17, the column decoder selects the two bit lines BL1 and BL2 using the logic signal COL12.

Moreover, this time it is the gate control line CGL0 that is selected.

Consequently, the second datum D1 of the piece of information is stored simultaneously in the two memory cells M0,2 and M0,3 of the first line L0.

The write operation then continues sequentially until the last datum D31 of the piece of information is written into the memory cell M0,31.

This is done by selecting the bit line BL31 by means of the logic signal COL31 and selecting the gate control line CGL0 (FIG. 18).

At the end of this write operation, as illustrated in FIG. 19, a checkerboard filling of the memory area is obtained such that a datum, with the exception of the last datum D31, is stored in two adjacent memory cells of the same line and that two successive data are respectively stored in two twin cells of the same column.

Moreover, the twin cell M0,0 of that M1,0 storing the datum D0 stores the value 1 while the last datum D31 is stored in the twin memory cell M0,31 of the memory cell M1,31 storing the datum D30.

Reference is now made more particularly to FIGS. 20 to 27 to illustrate an example of reading the piece of information (code RD2) stored in the memory area ZM.

Since the zero voltage (ground GND) is applied in reading on the control gates of all the memory cells of the memory area, the reading of a first twin memory cell of a column simultaneously leads to the reading of the second twin cell.

Now, if the first twin cell contains a logical "1", then this logical "1" will mask the read value of the datum located in the second twin cell.

Indeed, the reading of these two twin cells will always give a logical "1" regardless of the value of the datum stored.

This is the reason why it is necessary, before reading a memory cell, to replace the value stored in its twin cell with a reference bit selected so as to allow the correct restoration of the stored datum. In this case, this reference bit will have the value "0" which corresponds to prior programming of the twin cell so as to store a "0" therein.

This is illustrated in FIG. 20.

More specifically, the bit line BL0 is selected using the logic signal COL0 and, the memory cell M0,0 is programmed using the line control signal CGL0 so as to store a logical "0" therein.

Then, the two twin cells M0,0 can be read so as to store a logical "o" therein.

Then, the two twin cells M0,0 and M1,0 can always be read by selecting the bit line BL0 using the logic signal COL0, as illustrated in FIG. 21.

And, this time, the datum D0 is correctly read.

Indeed, if the datum D0 is equal to 0, then the value 0 will actually be read by the sense amplifier circuit AMP.

And, if the logical value of the datum D0 is equal to 1, then a logical "1" will be read by the sense amplifier circuit AMP.

The datum D1 is then read as illustrated in FIGS. 22 and 23.

And, as this time the column decoder will select the two bit lines BL0 and BL1 simultaneously, and the zero voltage GND is applied to the control gates of state transistors of all the memory cells, there will be a simultaneous reading of the two twin cells located on the column "0" and the two twin cells located on the column "1".

Also, in order to obtain a correct restoration of the logical value of the datum D1, it is necessary, prior to the reading of this datum D1, not only to program the twin cell of the cell D1 with the value "0" but also to program the cell which included the datum D0 previously read.

This is illustrated in FIG. 22.

It can be seen that in this preliminary programming step, by selecting the bit lines BL0 and BL1 by the logic signal COL01 and by applying the programming voltage to the gate control line CGL1, the memory cells M1,0 and M1,1 will be programmed with the logical value "0".

As a result, as illustrated in FIG. 23, the selection of the two bit lines BL0 and BL1 and the application of the zero voltage GND on the control gates of the state transistors lead to simultaneously reading the logical value of the datum D1 and the three logical values "o" stored in the memory cells M0,0, M1,0 and M1,1.

As a result, the logical value of the datum D1 is correctly restored. Indeed, if this datum is equal to 0, then the sense amplifier circuit will effectively read a "0" while if this logical value is equal to 1, the sense amplifier circuit will effectively read a "1".

It should therefore be noted here that not only does the prior programming allow correct restoration of the datum to be read but that this prior programming also destroys the datum which has been previously read.

FIGS. 24 and 25 illustrate the reading of the following datum D2.

Prior to this reading, the cells M0,1 and M0,2 are programmed (FIG. 24) then the datum D2 stored in the memory cell M1,2 (FIG. 25) is read.

The datum D1 has therefore been destroyed.

FIGS. 26 and 27 illustrate the reading of the last datum D31.

In this regard, as illustrated in FIG. 26, the twin cell M1,31 is programmed beforehand then, as illustrated in FIG. 27, the cell D31 stored in memory cell M0,31 is read.

At the end of this reading, it is noted that all the memory cells except the last cell M0,31, store a logical 0.

Reading the N binary data of the stored code RD2 therefore destroyed all the bits of this code except the last one.

And, it is therefore no longer possible to read this code RD2 again in the memory area ZM.

This being the case, the D areas ZM1-ZMD will be read successively as indicated above for the area ZM, so as to allow the piece of information RD2 to be read only D times.

The Second Physical Unclonable Function Module MPF2 and its Operation

The second module MPF2 can be a physical unclonable function module having the features of the physical unclonable function device described in the French patent application filed under the n° 2002929, which is for all practical purposes incorporated by reference in the present patent application.

Some features are now recalled.

As illustrated in FIG. 28, the second module MPF2 comprises a second set 2 of non-volatile memory cells CEL.

The device DIS also includes second processing means MT2 configured to deliver the unpredictable code HUK1 from a reading of the effective threshold voltages of the state transistors of the memory cells CEL of the second set 2.

Each memory cell CEL has the features described with reference to FIG. 6.

But as illustrated in FIG. 29, the cell CEL includes a state transistor T having a control gate CG and a floating gate FG which are here electrically connected for example by means of a via or contact which is not located in the plane of FIG. 29 but which is shown schematically by two dotted lines.

The floating gate FG is separated from the semiconductor substrate SUB by a gate oxide OX the thickness of which is advantageously greater than 8 nanometres, for example comprised between 8 and 10 nanometres.

The drain D of the state transistor T is connected to a bit line by means of a contact CBL.

The control gate CG of the transistor T is in turn connected to a gate control line.

As indicated above, the channel of the state transistor T includes a channel implanted on the surface CH, which is for example N doped, so that the corresponding memory cell operates in a depletion mode.

In other words, the state transistor T being of the depletion type, the normally on character of the state transistor when the memory cell is in a virgin state and a zero voltage is applied to the control gate is related to the value of its threshold voltage in the virgin state of the memory cell which can be selected negative or substantially zero.

In the case of a channel of conductivity N, the implanted dopants can be, for example, arsenic As and the concentration of dopants determines the threshold voltage of the transistor T of a memory cell in the virgin state.

As for the cells of the first set 1, the state transistor is here configured to have a negative threshold voltage if the memory cell in the virgin state, for example of the order of −1 volts.

All state transistors of all the cells CEL in the first set are intended to have the same threshold voltage.

However, the effective threshold voltages, that is to say the actual values of the threshold voltages, vary slightly according to a random dispersion, for example due to physical manufacturing distortions. This type of dispersion is usual and known per se.

Since the control and floating gates of the state transistors are electrically connected, the state transistors inherently have greater variability against these distortions and therefore a wider distribution.

Thus, the transistors T of the cells CEL of the second set 2 each have an effective threshold voltage belonging to a common random distribution.

In particular, the common random distribution may be a distribution of threshold voltages of transistors of virgin memory cells that have never been written.

If reference is made again to FIG. 28, it can be seen that the second processing means MT2 include a third set 3 of memory cells CELM each also having a selection transistor buried in a semiconductor substrate and a state transistor having a control gate and a floating gate.

In fact, the memory cells CELM are similar to the memory cells CEL except that the floating gates and the control gates of the state transistors are not electrically connected. They also have the features described with reference to FIG. 6.

As will be seen in more detail below, these memory cells CELM are intended to store pieces of reliability information representative of the reliability or unreliability of the contents of the memory cells CEL of the second set 2.

The second processing means MT2 include first generation means MGEN1 configured to generate said pieces of reliability information.

The second processing means MT2 also include second generation means MGEN2 configured to generate the code HUK1 at least from readings of the effective threshold voltages of the state transistors of the memory cells CEL and from said pieces of reliability information contained in the memory cells CELM of the third set 3.

An example of the structure and operation of the first generation means MGEN1, the second generation means MGEN2 and the matrix arrangement of the second set of cells 3 will be more detailed.

If reference is now made more particularly to FIG. 30, it can be seen that in this advantageous embodiment, the second set 2 of non-volatile memory cells CEL is organised in second two matrix subsets 20L and 20R disposed symmetrically compared to second reading means LECT2 of conventional structure known per se, typically including sense amplifiers 5.

All the lines or rows of the second two matrix subsets 20L and 20R are parallel.

The line decoding of each of these two subsets 20L, 20R is performed by line decoders XDEC of conventional structure known per se, while the column decoding of these first two subsets is performed by two column decoders YDEC, also of conventional structure known per se, disposed symmetrically relative to the sense amplifiers 5.

And, these second reading means LECT2 are configured to perform differential readings of the effective threshold voltages of the state transistors of the pairs of symmetrical memory cells CELijL and CELijR or CELmpL and CELmpR and located respectively in the second two subsets 20L and 20R on similar columns of these second two subsets.

And, the memory cells of the third set 3 are intended to contain the pieces of reliability information representative of the reliability or the unreliability of the contents of the pairs of memory cells of the second set.

These pieces of reliability information are here binary data having a first logical value, for example the logical value 0, representative of an unreliability of the contents of a given pair of memory cells of the second set or else a second logical value, for example the logical value 1, representative of a reliability of the contents of a given pair of memory cells of the second set.

Thus, by way of example, in FIG. 30, the piece of reliability information Mij, here having the logical value 0, is representative of the unreliability of the contents bijL and bijR of the pair of memory cells CELijL and CELijR of the second set.

On the other hand, the piece of reliability information Mmp which has the logical value 1, is here representative of the reliability of the contents bmpL and bmpR of the pair of memory cells CELmpL and CELmpR of the second set.

The set of these pieces of reliability information forms a mask MSK.

Reference is now made more particularly to FIG. 31 to describe a differential reading RD performed by second reading means LECT2 incorporating the sense amplifiers 5.

In the example illustrated in FIG. 31, the second reading means LECT2 are configured to measure the difference between the effective threshold voltages of the pair of state transistors T belonging respectively to the two memory cells CELijL and CELijR.

The second reading means are coupled to the transistors T via the respective bit lines BLL and BLR.

The selection transistors ST are controlled on their gate by signals conveyed on the respective word lines WLL and WLR.

In addition to the sense amplifiers 5, the second reading means include reference current generators 51 which may or may not be connected to the sense amplifiers 5 via switches.

In the context of a differential reading RD such as that illustrated in FIG. 31, advantageously carried out with the control gates of the state transistors connected to ground, the reference current generators are not connected to the sense amplifiers 5.

The sense amplifier 5 is configured to amplify a difference between the current ICL flowing in the cell CELijL and the current ICR flowing in the cell CELijR.

Since these read currents ICL and ICR are representative of the effective threshold voltages of the floating gate transistors of the respective cells CELijL and CELijR, the difference of these currents is representative of the difference between the effective threshold voltages of these state transistors.

Thus, the second reading means LECT2 are capable of measuring the difference between the effective threshold voltages of the pairs of state transistors of two cells disposed on corresponding bit lines.

And, by way of non-limiting example, it can be decided that if the current ICL is greater than the current ICR, then the datum DATAij contained in this pair of cells has a logical value 0 while if the current ICL is less than the current ICR, then this datum has a logical value 1.

Of course, the reverse convention could have been adopted.

Reference is now made more particularly to FIGS. 32 and 33 to describe differential readings of the effective threshold voltages of the state transistors of the pairs of memory cells taking into account a margin value.

Here again, these differential readings are advantageously carried out with the control gates of the state transistors connected to ground.

FIG. 32 illustrates a first differential reading RDM0 taking into account a margin value.

More specifically, during this reading RDM0, the additional current IREF generated by one of the current generators 51 is added to the current flowing by the cell CELijR.

This allows to measure a difference between the effective threshold voltages above a certain margin.

The value of the margin corresponds to the current IREF representative of a reference voltage deviation.

This margin value is selected in particular according to the precision of the second reading means LECT2.

As an indication, the value of the current IREF can be equal to 2 microamperes.

And, in this case, if the current ICL is greater than the sum of the current ICR and the current IREF, then the stored datum DATAij is taken equal for example to 0.

In FIG. 33, another differential reading RDM1 is illustrated, carried out by the second reading means LECT2 and taking into account the margin value.

More specifically, in this case, the reference current IREF is added to the current ICL flowing in the cell CELijL.

And, for example, if the current ICR is greater than the sum of the current ICL and the current IREF, then DATAij is equal to 1.

Reference is now made more particularly to FIG. 34 to describe an example of the structure of the first generation means MGEN1 allowing to generate the pieces of reliability information of the mask MSK.

As illustrated in this FIG. 34, the pieces of reliability information are generated taking into account a margin value on the differential readings RDM0 and RDM1 of the effective threshold voltages of the state transistors of the pairs of memory cells.

More specifically, the first generation means MGEN1 include the second reading means LECT2 configured to perform, for each pair of memory cells of the second set 1, a first reading, for example the reading RDM0, of the difference between, on the one hand, the current flowed by a first memory cell of said pair increased by the reference current representative of said margin value and, on the other hand, the current flowed by the second memory cell of said pair so as to obtain a first binary datum.

The second reading means LECT2 are also configured to perform a second reading, for example the reading RDM1, of the difference between, on the one hand, the current flowed by the second memory cell increased by the reference current and, on the other hand, the current flowed by the first memory cell so as to obtain a second binary datum.

In the example described here, for the sake of simplification, there is shown a group of 16 first binary data DB1, for example [0000 0111 1111 1111], obtained at the end of the first reading RDM0 and a corresponding group of 16 second binary data DB2, for example [0000 0000 0000 1111], obtained after the reading RDM1.

The generation means MGEN1 also include a module, generally referenced by the reference 222, configured to generate and write the mask MSK in the third set 3 of memory cells.

This module 222 includes an inverter IV allowing to invert one of the groups of binary data, for example the group of first binary data DB1 resulting from the reading RDM0, so as to obtain, in the illustrated case, the group [1111 1000 0000 0000].

Then, comparison means, for example an OR-gate referenced PL, allow to compare bit by bit the group of second binary data DB2 originating from the reading RDM1 with the inverse of the group of first binary data DB1 originating from the reading RDM0.

If an inverted bit effectively has a logical value opposite to that of the corresponding non-inverted bit, then the datum can be considered reliable and assign a 1 to the corresponding piece of reliability information, which is obtained by the logic OR-gate.

On the other hand, if the logical value of the inverted bit is equal to the logical value of the corresponding non-inverted bit, then the datum is considered unreliable and the corresponding piece of reliability information will have the logical value 0.

Therefore, a mask MSK including as many bits as there are pairs of memory cells in the second set 2 is obtained. In the illustrated case, the mask MSK is equal to [1111 1000 0000 1111].

Of course, it would be possible to replace the inverter and the OR-gate by a logic gate of the EXCLUSIVE OR (XOR) type.

The module 222 also includes writing means PROG, of conventional and known structure, allowing to write the pieces of reliability information (bits) of the mask MSK in the corresponding memory cells of the third set 3.

Reference is now made more particularly to FIG. 35 to describe an example of the structure of the second generation means MGEN2 configured to generate the code HUK1 from the differential readings of the effective threshold voltages of the state transistors of the pairs of memory cells and the pieces of reliability information associated with these pairs of memory cells.

More specifically, the second reading means LECT2 carry out a conventional differential reading RD of the pairs of homologous memory cells respectively located in the two subsets 20L and 20R so as to obtain a first set of output data JS1, for example [0000 0000 0111 1111], including in this simplified example 16 binary output data.

This reading is advantageously carried out with the control gates of the state transistors connected to ground.

Conventional reading means MLCT also including sense amplifiers such as the sense amplifiers 5, perform a conventional reading RDMSK of pieces of reliability information MSK corresponding to the pairs of cells read and contained in the memory cells CELM of the third set 3, for example [1111 1000 0000 1111].

This reading RDMSK is also advantageously carried out with the control gates of the state transistors connected to ground.

The second generation means MGEN2 then include masking means 4 configured to keep as a code HUK1 only the binary data of the set JS1 which are assigned a piece of reliability information meaning that the datum is reliable, in this case a piece of reliability information equal to 1.

In the present case, the data considered as reliable (value 1) are the first five bits on the left and the last four bits, the other bits being uncertain (X).

Therefore, as shown in FIG. 35 as an example, the code HUK1 will only have 9 bits out of the 16 in the set JS1 [0000 0XXX XXXX 1111].

Although this is not essential, it is preferable, as illustrated in FIG. 36, that the third set 3 of memory cells which is intended to store the pieces of reliability information, includes two third subsets 30L and 30R respectively distributed on either side of the second subsets 20L and 20R.

Moreover, the pieces of reliability information associated with the pairs of memory cells are stored in the memory cells of the third set located on the same columns as those on which said corresponding pairs of memory cells are located.

Moreover, the first set 1 of memory cells including the two subsets 10L and 10R, the second set 2 of memory cells including the two subsets 20L and 20R, the third set 3 of memory cells including the two subsets 30L and 30R, the memory plane of the non-volatile memory device DM as well as the management means are located within the same integrated circuit IC.

This simplifies the column decoding and makes it even more difficult to extract the data by an attack, for example on the rear face, from the device DIS.

Column Decoder Architecture Compatible with "Single Bit Line" and "Double Bit Line" Memory Plane Architectures.

Due to the disparity in the structure of the different memory planes of the device DIS (architecture with single bit line per column for the memory plane of the memory areas ZM1-ZMD, and architecture with two bit lines per column for the sets 1, 2 and 3 of the memory cells), some metallizations of the integrated circuit are interrupted and are assigned only to some columns (bit lines) of the memory plane of the memory areas ZM1-ZMD, while other metallizations are common to a column of the memory plane of the memory areas ZM1-ZMD and to a column of the memory planes of the sets 1, 2 and 3, and other metallizations are assigned only to columns of the memory planes of the sets 1, 2 and 3.

This is partially illustrated in FIG. 37, where it can be seen that an interrupted metallisation MET2A corresponds to the bit line BL0 of column 0 referenced COL0 of the memory plane of the memory areas ZM1-ZMD, and that another metallisation MET2B corresponds to the bit line BL1 of column 1 COL1 of the memory plane of the memory areas ZM1-ZMD as well as to one B1,0 of the bit lines of the column 0 COL0 of the memory planes of the sets 1, 2 and 3.

The other bit line B2,0 of the column 0 COL0 of the memory planes of the sets 1, 2 and 3 is represented by the metallisation MET3.

Two other metallizations MET5 correspond to the two bit lines B1,1 and B2,1 of the column 1 COL1 of the memory planes of the sets 1, 2 and 3.

Thus, as illustrated schematically in FIG. 38, some columns of the memory plane of the memory areas ZM1-ZMD are individually addressable, in this case the columns of even rank, COL0, COL2, . . .

The columns of odd rank COL1, COL3, . . . of the memory plane of the memory areas ZM1-ZMD can be addressed simultaneously to the columns of rank $4k$, COL0, COL4, . . . of the memory planes of the sets 1, 2 and 3.

Columns of ranks $4k+1$, $4k+2$ and $4k+3$, COL1, COL2, COL3, COL5, COL6, COL7, . . . of the memory planes of the sets 1, 2 and 3 are individually addressable.

A single column decoder COLDEC, illustrated schematically in FIG. 38, is configured for
individually selecting the two columns located at the two ends of each memory area ZMi, simultaneously selecting two adjacent columns of each memory area ZMi and a column of the first, second and third sets common to one of these two adjacent columns, and individually selecting the other columns of the first, second and third sets.

This column decoder includes switches based on MOS transistors, controlled on their gate by control signals and whose sources are connected to a common node ND connected to reading or programming means.

Here for the sake of simplification only 10 switches SW0-SW9 controlled by control signals SC0, SCA to SCJ are shown.

The signal SC0 which controls the switch SW0 allows to individually select the column COL0 of the memory areas ZMi.

The signal SCA which controls the switches SW0 and SW1 allows to select the column COL0 of the sets of memory cells 1, 2 and 3 as well as simultaneously the columns COL0 and COL1 of the memory areas ZMi.

The signal SCB which controls the switches SW1 and SW5 allows to select the column COL0 of the sets of memory cells 1, 2 and 3 as well as simultaneously the columns COL1 and COL2 of the memory areas ZMi.

The signal SCC which controls the switch SW2 allows to select the column COL1 of the sets of memory cells 1, 2 and 3.

The signal SCD which controls the switch SW3 allows to select the column COL2 of the sets of memory cells 1, 2 and 3.

The signal SCE which controls the switch SW4 allows to select the column COL3 of the sets of memory cells 1, 2 and 3.

The signal SCF which controls the switches SW5 and SW6 allows to select the column COL4 of the sets of memory cells 1, 2 and 3 as well as simultaneously the columns COL2 and COL3 of the memory areas ZMi.

The signal SCG which controls the switches SW6 and another switch not shown in this figure for the sake of simplification allows to select the column COL4 of the sets of memory cells 1, 2 and 3 as well as simultaneously the columns COL3 and COL4 of the memory areas ZMi.

The signal SCH which controls the switch SW7 allows to select the column COL5 of the sets of memory cells 1, 2 and 3.

The signal SCI which controls the switch SW8 allows to select the column COLE of the sets of memory cells 1, 2 and 3.

The signal SCJ which controls the switch SW9 allows to select the column COL7 of the sets of memory cells 1, 2 and 3, and so on . . . .

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An integrated device comprising:
a first physical unclonable function module configured to generate an initial data group; and
a management module configured to:
generate an output data group from at least the initial data group,
authorize only D successive deliveries of the output data group on a first output interface of the device, D being a non-zero positive integer, and
prevent any additional generation of the output data group.

2. The device according to claim 1, wherein the management module is configured to prevent any additional generation of the output data group by preventing any new generation of the initial data group.

3. The device according to claim 1, wherein the first module comprises:
a first set of non-volatile memory cells, each having a selection transistor buried in a semiconductor substrate and a state transistor having a control gate and a floating gate, the state transistors having respective effective threshold voltages belonging to a common random distribution, and
a reading module configured to deliver the initial data group from reading the effective threshold voltages of the state transistors of the memory cells of the first set.

4. The device according to claim 3,
wherein the first set of non-volatile memory cells is organized in first two matrix subsets disposed symmetrically relative to the reading module, all lines of the first two matrix subsets being parallel, and
wherein the reading module is configured to perform differential readings of the effective threshold voltages of state transistors of pairs of symmetrical memory cells located respectively in the first two subsets on homologous columns of the first two subsets.

5. The device according to claim 4, wherein the management module is configured to program or erase the memory cells of one of the two subsets after the reading of the initial data group so as to prevent any new generation of the initial data group.

6. The device according to claim 1,
wherein the initial data group includes G initial data, and
wherein the management module comprises a non-volatile memory device comprising:
a memory plane including D memory areas, each memory area being configured to store a succession of N data including the G initial data, N being greater than or equal to G; and
a first processing module configured to:
successively extract the N data from the D memory areas; and
destroy at least part of a content of a corresponding memory area during the extraction of the N corresponding data.

7. The device according to claim 6, wherein each memory area includes a matrix of memory cells having two rows and N columns, each memory cell comprising a state transistor having a control gate and a floating gate, selectable by a vertical selection transistor buried in a substrate and including a buried selection gate, each column of memory cells including a pair of twin memory cells, two selection transistors of a pair of twin memory cells having a common selection gate, and wherein the first processing module is configured to store in the memory area the succession of N bits so that, with exception of the last bit of the succession, a current bit of the succession is stored in two memory cells located on the same row and on two adjacent columns and a current bit and the next bit are respectively stored in two twin cells.

8. The device according to claim 7, wherein the first processing module is configured, in order to be able to read a bit stored in a first twin cell, to first replace the bit stored in a second twin cell with a reference bit having a reference value selected to allow correct restoration of the value of the bit stored in the first twin cell.

9. The device according to claim 8, wherein the first processing module is further configured to sequentially read the N bits of the succession and replace a current bit already read of a piece of information with the reference bit before being able to read the next bit of the succession so as to destroy the current bit during the extraction of the next bit.

10. The device according to claim 6, wherein the matrix of memory cells of each memory area includes a single bit line per column, connected to drains of state transistors of a pair of twin cells of a corresponding column, and one gate control line, per row of memory cells, connected to all the control gates of the state transistors of the memory cells of the corresponding row.

11. The device according to claim 6, wherein the first processing module comprises a column decoder configured to individually select two bit lines associated with two columns located at two ends of the memory area and to simultaneously select two adjacent bit lines, for both storing the succession of N bits and reading and replacing the bits beforehand.

12. The device according to claim 6, wherein the output data group comprises the N bits of the succession.

13. The device according to claim 1, wherein the management module comprises:
a second physical unclonable function module configured to generate a group of additional data, and
a development module configured to develop the output data group from at least the initial data group and at least the additional data group.

14. The device according to claim 13, wherein the management module is further configured to deliver on a second output interface of the device the group of additional data.

15. The device according to claim 13, wherein the second physical unclonable function module comprises:
a second set of non-volatile memory cells, each having a selection transistor buried in a semiconductor substrate and a depletion type state transistor having an electrically connected control gate and a floating gate, the state transistors having respective effective threshold voltages belonging to a common random distribution, and
a second processing module configured to deliver a group of additional data from a reading of the effective threshold voltages of the state transistors of the memory cells of the second set.

16. The device according to claim 15,
wherein the second processing module includes a second reading module configured to perform reading,
wherein the second set of non-volatile memory cells is organized in second two matrix subsets disposed symmetrically relative to the second reading module, all lines of the second two matrix subsets being parallel, and
wherein the second reading module is configured to perform differential readings of the effective threshold voltages of state transistors of pairs of symmetrical memory cells and located respectively in the second two subsets on homologous columns of the second two subsets.

17. The device according to claim 15, wherein the second processing module includes a third set of memory cells, each having a selection transistor buried in a semiconductor substrate and a state transistor having a control gate and a floating gate, the memory cells of the third set being intended to contain pieces of reliability information representative of reliability or unreliability of contents of pairs of memory cells of the second set.

18. The device according to claim 17, wherein the third set includes a matrix arrangement of memory cells sharing the same columns as those of the matrix arrangement of memory cells of the second set.

19. A method comprising:
automatically generating, at the first output interface of the device according to claim 1, a unique unpredictable code,
wherein the unique unpredictable code is the output data group,
wherein the device comprises at least one reading of a memory area of a non-volatile memory device.

20. The method according to claim 19, further comprising:
generating, during a test phase, the initial data group;
storing, in D memory areas of the device, a piece of information of N data;
programming or deleting part of memory cells of the first set after generating the initial data group; and
generating and storing a piece of reliability information.

* * * * *